United States Patent
Kutchko et al.

(10) Patent No.: US 12,228,536 B2
(45) Date of Patent: Feb. 18, 2025

(54) RADIO FREQUENCY SIGNALING SYSTEM AND CURABLE COMPOSITION

(71) Applicant: PPG Industries Ohio, Inc., Cleveland, OH (US)

(72) Inventors: Cynthia Kutchko, Pittsburgh, PA (US); Arjen Vellinga, Amsterdam (NL); David N. Walters, Slippery Rock, PA (US); Peter L. Votruba-Drzal, Pittsburgh, PA (US); Kurt G. Olson, Gibsonia, PA (US); Sara Teixeira, Amsterdam (NL); Arnold Johan Nederlof, Santpoort-Noord (NL); Sijmen Johan Visser, Marken (NL); Chun Yong Lee, Busan (KR)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 17/753,185

(22) PCT Filed: Aug. 28, 2020

(86) PCT No.: PCT/US2020/048422
§ 371 (c)(1),
(2) Date: Feb. 23, 2022

(87) PCT Pub. No.: WO2021/041820
PCT Pub. Date: Mar. 4, 2021

(65) Prior Publication Data
US 2022/0276191 A1 Sep. 1, 2022

Related U.S. Application Data

(60) Provisional application No. 62/893,437, filed on Aug. 29, 2019.

(51) Int. Cl.
*G01N 27/22* (2006.01)
*G01F 23/263* (2022.01)

(52) U.S. Cl.
CPC ......... *G01N 27/221* (2013.01); *G01F 23/266* (2013.01)

(58) Field of Classification Search
CPC .................................................. G01N 27/221
See application file for complete search history.

(56) References Cited

U.S. PATENT DOCUMENTS 5,754,055 A * 5/1998 McAdoo ............ G01N 33/2888
324/636
7,456,744 B2 11/2008 Kuhns et al.
(Continued)

FOREIGN PATENT DOCUMENTS

AU 2016228266 A1 4/2017
CN 101583866 A 11/2009
(Continued)

OTHER PUBLICATIONS

Imam et al. "Enhanced Sensitivity of Low Frequency (LF) RFID Sensor Signal for Structural Health Monitoring (SHM) in High Temperature Environment", 19th World Conference on Non-Destructive Testing 2016.
(Continued)

*Primary Examiner* — Alesa Allgood
(74) *Attorney, Agent, or Firm* — Workman Nydegger

(57) ABSTRACT

A radio frequency signaling system includes a curable coating composition configured to be cured to form a cured coating and a sensor received in the curable coating composition. The sensor includes circuitry forming an inductor-capacitor circuit. The circuitry has a maximum outer diameter of 10 μm-2.0 mm. The circuitry is configured to generate an electromagnetic field in response to an external
(Continued)

radio frequency signal. A container configured to be monitored by a radio frequency signaling system is also provided. The container includes: a container body having an outer surface and an inner surface; a cured coating on the inner surface and/or the outer surface of the container body; and a sensor positioned in the cured coating configured to detect absorption of a fluid contained in the container body by the cured coating.

20 Claims, 17 Drawing Sheets

(56) References Cited

U.S. PATENT DOCUMENTS

| | | | |
|---|---|---|---|
| 8,085,165 | B2 | 12/2011 | Wavering et al. |
| 9,919,787 | B2 | 3/2018 | Jiao |
| 10,466,201 | B2 | 11/2019 | Duarte |
| 2011/0320142 | A1 | 12/2011 | Surman et al. |
| 2014/0111349 | A1* | 4/2014 | Roberson ............... E21B 47/10 235/492 |
| 2015/0047275 | A1 | 2/2015 | McCarthy et al. |
| 2015/0211934 | A1 | 7/2015 | Van et al. |
| 2020/0405173 | A1 | 12/2020 | Suster et al. |

FOREIGN PATENT DOCUMENTS

| | | |
|---|---|---|
| CN | 102959378 A | 3/2013 |
| CN | 10407496 A | 7/2015 |
| CN | 107054244 A | 8/2017 |
| CN | 108780056 A | 11/2018 |
| EP | 2868719 A1 | 5/2015 |

OTHER PUBLICATIONS

Khalifeh et al. "Development of radio frequency resonator for monitoring water diffusion in organic coatings", Sensors and Actuators: A Physical 247 (2016) 30-36.

Zarifi et al. "Wireless Passive RFID Sensor for Pipeline Integrity Monitoring", Sensors and Actuators: A Physical (2017), http://dx.doi.org/10.1016/j.sna.2017.04.006.

Moreno et al. "Characterization of Water Uptake by Organic Coatings Used for the Corrosion Protection of Steel as Determined from Capacitance Measurements", Int. J. Electrochem. Sci., (2012) 7390-7403.

Zhang et al. "A Review of Passive RFID Tag Antenna-Based Sensors and Systems for Structural Health Monitoring Applications" Sensors 2017, 17, 265; doi:10.3390/s17020265.

E. Hardi et al: "Use of RFID tags for monitoring resin flow and investigation of their influence on the mechanical properties of the composite", Procedia Manufacturing, vol. 24, Jun. 20, 2018, pp. 305-310, XP055752525, ISSN: 2351-9789, DOI: 10.1016/j.promfg.2018.06.023.

International Search Report and Written Opinion received for PCT Application Serial No. PCT/US2020/048422 dated Feb. 1, 2021, 18 pages.

Hardi et al, "Use of RFID tags for 1-15, monitoring resin flow and investigation of their influence on the mechanical properties of the composite," Procedia Manufacturing, vol. 24, Jun. 20, 2018, pp. 305-310.

International Preliminary Report on Patentability received for PCT Patent Application No. PCT/US20/48422, mailed on Mar. 10, 2022, 13 pages.

Invitation to Pay Additional Fees received for PCT Patent Application No. PCT/US20/48422, mailed on Dec. 4, 2020, 13 pages.

Office Action received for Korean Patent Application No. 10-2022-7009516, mailed on Jan. 17, 2024,, 10 pages (4 pages of English Translation and 4 pages of Original Document).

He et al. "Radio Frequency Identification (RFID) based on corrosion monitoring sensors: Part II Application and testing of the coating materials" (2014).

Khalifeh et al. "Development of wireless and passive corrosion sensors for material degradation monitoring in coastal zones and immersed environment" (2016).

\* cited by examiner

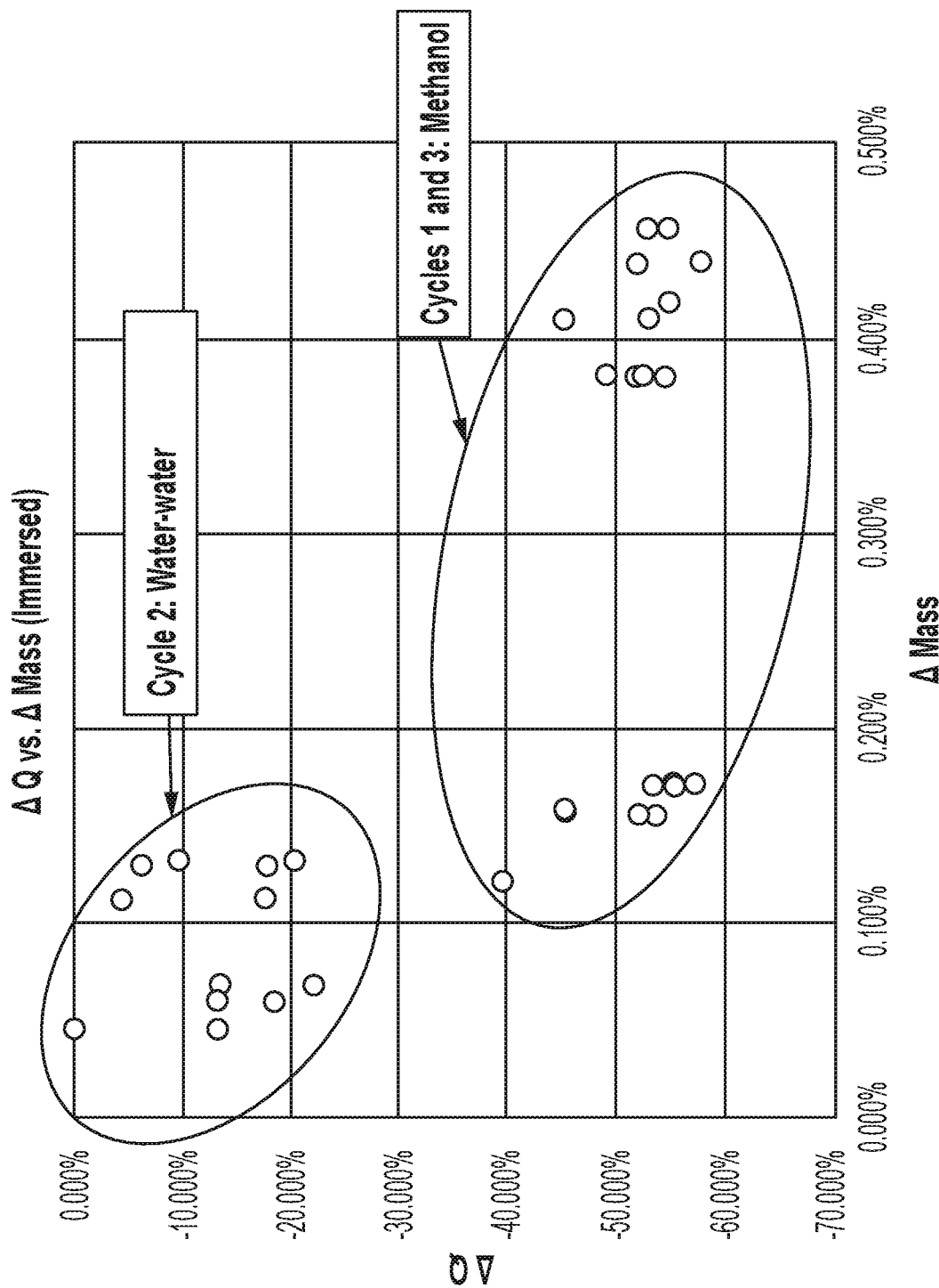

RADIO FREQUENCY SIGNALING SYSTEM AND CURABLE COMPOSITION

FIELD OF THE INVENTION

This disclosure relates to radio frequency signaling systems and methods for detecting a condition of a cured coating including a sensor received in a curable coating composition, which forms the cured coating.

BACKGROUND OF THE INVENTION

Coatings are applied to surfaces of articles, such as vehicles, machines, buildings, containers, and other structures and objects, to protect the surfaces from damage caused by use and/or exposure to environmental conditions. Often such coatings comprise layers of one or more curable coating compositions, which prevent corrosive agents from coming into contact with underlying structure or bulk materials of the structures or objects. However, coatings can deteriorate and eventually fail, allowing corrosive materials to come into contact with the underlying structure and bulk materials of the article.

Liquid chemicals and gasses, such as chemicals stored in containers, such as transport tanks, storage tanks, or ballast tanks, can also permeate into and/or be absorbed by coatings, even when the coating is substantially intact or has not started to deteriorate. The absorbed liquid chemicals and gasses can cause cargo contamination.

Various electromechanical sensors can be positioned in proximity to coated articles to identify or detect a presence of corrosive agents or liquid chemicals near the coating or article. Some conventional monitoring systems include moisture sensors positioned on a coated surface of an object or between the coated surface and a bulk surface of the object. Chemical and analyte sensors positioned near a coated article can also be used to identify corrosive agents in a similar fashion to the moisture sensors. Some monitoring systems also include environmental sensors, such as temperature and humidity sensors, for detecting environmental conditions surrounding the coated article being monitored.

SUMMARY OF THE INVENTION

The invention can include a radio frequency signaling system including: a curable coating composition configured to be cured to form a cured coating; and a sensor received in the curable coating composition. The sensor includes circuitry forming an inductor-capacitor circuit. The circuitry has a maximum outer diameter of 10 μm-2.0 mm. The circuitry is configured to generate an electromagnetic field in response to an external radio frequency signal.

The invention can further include a radio frequency system for monitoring a condition of a cured coating. The system includes a cured coating formed from a curable coating composition, a sensor positioned in the cured coating, and a radio frequency device. The sensor includes circuitry forming an inductor-capacitor circuit having a maximum outer diameter of 10 μm-2.0 mm. The radio frequency device is configured to generate and provide a radio frequency signal to the cured coating sufficient to power the circuitry of the sensor. The radio frequency signal causes the circuitry to generate the electromagnetic field, such that the electromagnetic field extends from the circuitry into the cured coating. The radio frequency device is further configured to measure a frequency response of the circuitry.

The invention can further include a container configured to be monitored by a radio frequency signaling system. The container includes: a container body having an outer surface and an inner surface; a cured coating on the inner surface and/or the outer surface of the container body; and a sensor positioned in the cured coating configured to detect absorption of a fluid contained in the container body by the cured coating.

The invention can further include a method of monitoring a condition of a container containing a fluid. The method includes receiving, with a processor, a radio frequency signal from a sensor positioned within a cured coating covering a surface of the container; processing, with a processor, the received radio frequency signal to determine an electrical property of the cured coating; and determining, with a processor, an amount of the fluid that has been absorbed by the cured coating based on a comparison between the determined electrical property of the cured coating and a baseline for the electrical property of the cured coating.

The invention can further include an article including a body having a dielectric material and a sensor embedded in the dielectric material of the body. The sensor includes circuitry forming an inductor-capacitor circuit. The circuitry has a maximum outer diameter of 10 μm-2.0 mm. The circuitry is configured to generate an electromagnetic field in response to an external radio frequency signal.

The invention can further include an insulated pipe configured to be monitored by a radio frequency signaling system. The insulated pipe can include: an elongated tube having an inner surface and an outer surface; a cured coating on the inner surface or the outer surface of the elongated tube; a sensor partially or fully encapsulated by the cured coating configured to sense a dielectric property of the cured coating; and insulation covering the cured coating and/or outer surface of the elongated tube.

BRIEF DESCRIPTION OF THE DRAWINGS

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limit of the invention.

Further features and other aspects and advantages will become apparent from the following detailed description made with reference to the drawings in which:

FIGS. 10A-10C are graphs showing changes in sensor signals versus change in mass for panels including radio frequency sensors immersed in a liquid.

DETAILED DESCRIPTION OF THE INVENTION

Figure 1A:
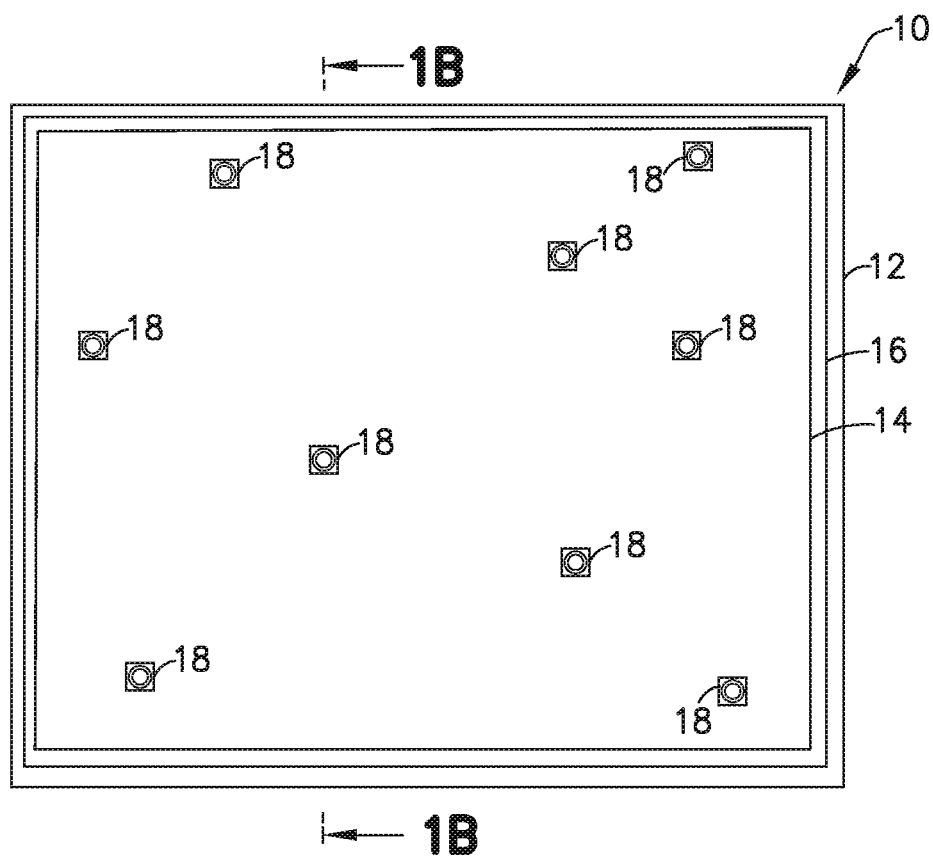
FIG. 1A is a top view of a substrate covered by a cured coating including sensors of a radio frequency signaling system positioned in a coating.

For purposes of the following detailed description, it is to be understood that the invention may assume various alternative variations and step sequences, except where expressly specified to the contrary. Moreover, other than in any operating examples, or where otherwise indicated, all numbers expressing, for example, a duration of an electric pulse or of a pause between pulses, as used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Also, it should be understood that any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1.

As used herein, the singular form of "a", "an", and "the" include plural referents unless the context clearly dictates otherwise. For example, although the invention has been described in terms of "a" curable coating, "a" sensor, "a" radio frequency device, and "a" container, one or more of any of these components or any other components recited herein can be used according to the present invention.

As used herein, the terms "top", "bottom", and derivatives thereof shall relate to the invention as it is oriented in the drawing figures. However, it is to be understood that the invention can assume various alternative orientations and, accordingly, such terms are not to be considered as limiting. Also, it is to be understood that the invention can assume various alternative variations and stage sequences, except where expressly specified to the contrary. It is also to be understood that the specific devices and processes illustrated in the attached drawings, and described in the following specification, are examples. Hence, specific dimensions and other physical characteristics related to the embodiments disclosed herein are not to be considered as limiting.

The systems and methods disclosed herein provide unique ways for monitoring a condition of coated objects and the coatings adhered or applied thereto. In particular, the systems and methods disclosed herein use sensors to monitor a condition of a coating covering at least a portion of the article based on changes to properties or characteristics of the coating itself. As used herein, "monitoring a condition of a coating" refers to determining information about physical characteristics of the coating including whether the coating is damaged (e.g., identifying damage caused by cracks, scrapes, punctures, holes, tears, and other broken areas), whether the coating has suffered excessive wear, and/or which areas or portions of the coating are damaged and should be repaired or replaced. Monitoring a condition of the coating can also include identifying corrosion of the substrate covered by the coating, identifying a presence of liquids and gasses absorbed by the coating, and determining whether the coating is in a usable condition and/or estimating a remaining usable life of the coating. As used herein, an "estimated remaining usable life" refers to an estimated amount of time (e.g., hours, days, or months) until it is expected that the coating will need to be repaired or replaced.

More specifically, the present disclosure relates to radio frequency signaling systems 100 including electronic components that monitor a condition of a coating 14 and/or a coated substrate 10 or article to provide feedback about the coating 14. The coating 14 can include a dielectric material, such as a dielectric polymer material. A "dielectric material" refers to an insulating material, which can be polarized by an applied electromagnetic field. Electrical charge does not flow through the "dielectric material," as is the case for an electrically conductive material. Instead, charges or molecules in a dielectric material shift slightly from a normal or equilibrium position in response to the electromagnetic field. For materials formed from weakly bonded molecules, the molecules can become polarized and reorient in response to the electromagnetic field. Dielectric materials have a dielectric constant or relative permittivity related to capacitance of the dielectric material. It is believed that the dielectric constant and/or relative permittivity of the cured coating 14 changes as the condition of the coating changes and/or when the coating absorbs material, such as material contained in a coated container.

The systems 100 disclosed herein also include sensors 18 configured to be positioned in the cured coating 14 and/or along a surface of the substrate 10 covered by the coating 14.

The sensors 18 can be positioned or spread out across a wide area of the coating 14 to sense a condition of particular areas of the coating 14. The sensors 18 can be radio frequency sensors configured to provide a responsive radio frequency signal related to dielectric properties of the coating 14. The responsive signal can indicate a resonant frequency of circuitry of the radio frequency sensor 18. While not intending to be bound by theory, it is believed that a condition of the coating 14 can be monitored by tracking changes in the resonant frequency of the circuitry of the sensors 18. In particular, it is believed that if a real part of the dielectric constant for the coating 14 increases, the capacitance of circuitry of the sensor 18 increases and the resonant frequency of the circuit decreases. If the imaginary part of the dielectric constant for the coating 14 increases, the energy loss of the circuit will increase, meaning that the bandwidth or Q factor for the circuit will decrease. Therefore, a decrease in measured resonant frequency of the circuitry is believed to correspond to an increase in permittivity or the real component of the dielectric constant of the coating 14 of the circuit. An increase in permittivity or the real component of the dielectric constant is believed to be evidence of deterioration of a condition of the coating 14.

The sensors 18 can be any appropriate size and shape to be received or positioned in the coating 14. By "received in" or "positioned in", it is meant to include various techniques for inserting the sensors 18 into the curable coating composition, such as by embedding, encapsulating, inserting, depositing, or the like. Accordingly, as described herein, the sensors 18 are desirably sized to be received within the coating 14 without adversely affecting properties of the coating 14. In particular, the sensors 18 can be thin enough to be received in or positioned in the coating 14 without causing raised areas or other discontinuities over a surface of the coating 14. Similarly, the sensors 18 can have small enough surface areas so that they are not easily visible to the naked eye through the coating 14. As described herein, the sensors 18 can have a major dimension or maximum length of 10 μm to 2.0 mm.

In order to position the sensors 18 in the coating 14, the sensors 18 can be dispersed in a curable coating composition provided in an uncured state. As used herein, an "uncured state" refers to a state in which at least a portion of the curable coating composition has not been cured. In the "uncured state," at least a portion of the composition is capable of being spread across a surface of the substrate 10 by a convenient application technique. The curable coating composition can be flowable, having a sufficiently low viscosity that it can be applied to the substrate 10. The curable coating composition can comprise a paint, primer, or similar curable coating compositions. The curable coating composition can also be a sealant composition and/or an adhesive composition. The sensors 18 are shaped and sized to be dispersible within the curable coating composition without precipitating therefrom prior to use. The curable coating composition may be delivered to end users with a predetermined number of sensors 18 dispersed in the curable coating composition. In that case, the sensors 18 can be applied to the substrate 10 surface to be coated along with the curable coating composition by painting, spraying, or another technique for applying the curable coating composition onto the surface of a substrate 10 or article. The curable coating composition can be cured to form the cured coating 14. When the sensors 18 are well mixed in the curable coating composition, applying the mixture of the curable coating composition and the sensors 18 onto the surface of a substrate 10 can ensure that sensors 18 are positioned throughout the coating 14 and/or are substantially uniformly dispersed in the coating 14, so that information about multiple areas of the coating 14 can be collected by querying or interrogating the different sensors 18.

As used herein, "substantially uniform distribution" can refer to coatings in which sensors are distributed throughout a cured coating and in which each region of the coating includes substantially a same (e.g., within 5% or within 10%) number of sensors as do any other region of the coating. Distribution of the sensors 18 throughout the coating can be random or non-random depending on how the sensors 18 are applied to the substrate 10.

Sensors 18 can also be directly placed in wet or uncured portions of a curable coating composition, as follows. The curable coating composition may be applied to at least a portion of a substrate 10 and the sensors 18 may be manually positioned at various selected locations on the coating 14 using tweezers or similar placement tools. Alternatively, automated placement devices, such as picking and placement devices used in attaching components to circuit boards and other electronics, may be used to automatically place the sensors 18 into the curable coating composition. Direct placement of sensors 18 onto the curable coating composition allows for greater control over location and orientation of the sensors 18. In particular, direct placement allows for positioning of the sensors 18 according to a predetermined pattern to produce a desired distribution of sensors within the coating 14. Sensors 18 can also be placed on surfaces of the substrate 10. Once the sensors 18 are in place in the coating 14 and/or on the substrate 10, a layer of the curable coating composition can be applied to cover the sensors 18. The multiple coating layers of the curable coating composition can then be cured to form the cured coating 14 in which the sensors 18 are received.

The sensors 18 of the radio frequency signaling system 100 can be passive sensors. As used herein, "passive sensors" refers to sensors that do not include a separate independent power source. Instead, the passive sensors generate power only when brought into proximity to a scanner, reader, interrogator, or detector device emitting a radio frequency signal. When the sensor 18 is activated by the applied radio frequency signal, the sensor circuitry generates an electromagnetic field due to inductance-capacitance induced through the circuitry. The generated electromagnetic field penetrates into the coating 14, which influences properties of the generated field. The sensors 18 also generate a response signal representative of a resonant frequency of the sensor circuitry. The response signal can be detected and measured by the scanner, reader, or detector device.

Coated Substrate Including Radio Frequency Sensors

With specific reference to FIGS. 1A-1E, a substrate 10 configured to be monitored by an external radio frequency signaling system 100 is illustrated. The substrate 10 includes a substrate body 12, such as a metallic or non-metallic panel, structure, sheet, frame, or surface. The substrate 10 can include glass, plastic, ceramics, metals, and/or acrylics. The substrate 10 can be formed from a single material, as is the case for panel, window, transparency, or similar surface. Alternatively, the substrate 10 can include a variety of surfaces formed from different materials covered, at least in part, by a continuous coating, as would be the case for a coated article or object, such as a machine, vehicle, or building. The substrate 10 can be opaque, such as in a vehicle body or building panel. The substrate 10 may also be a transparent or substantially transparent sheet, such as a window of a building or vehicle. The substrate 10 may be an aircraft windshield. The substrate 10 may also be an inner surface of an article, such as an inner surface of a container, such as a tank (e.g., a transport tank, storage tank, or ballast tank) or pipeline, as described in further detail herein.

Figure 1B:
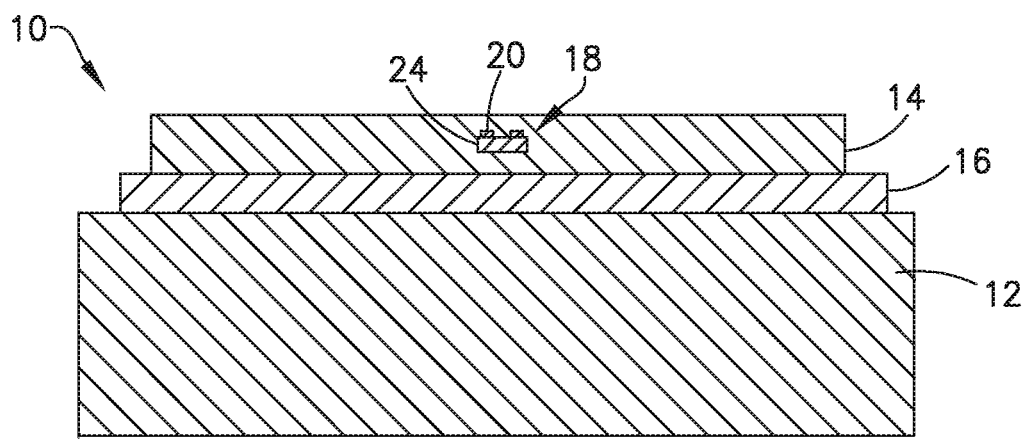
FIG. 1B is a cross-sectional view of the substrate of FIG. 1A taken along line 1B-1B.

The cured coating 14 comprising the dielectric material, such as the dielectric polymer material, covers at least a portion of a surface of the substrate body 12. The coating 14 can be formed from a reaction mixture of monomers that polymerize to form the dielectric polymer material. The dielectric polymer material can comprise, without limitation, epoxy, polyester, poly(methyl methacrylate), polyurethane, poly(ethylene terephthalate), and/or vinyl esters. As discussed previously, the sensors 18 of the radio frequency signaling system 100 can be dispersed in the curable coating composition such that, when the curable coating composition is cured to the substrate 10, the sensors 18 are randomly dispersed within the cured coating 14. A substrate 10 including sensors 18 randomly dispersed within the coating 14 across a surface of the substrate 10 is shown in FIGS. 1A and 1B. The curable coating composition can be provided to end users or customers as a fluid with sensors 18 already dispersed through the fluid. Alternatively, sensors 18 can be provided separately and mixed into the curable coating composition at a work site, painting location, or similar installation location before the curable coating composition is applied to the substrate 10.

Figure 1C:
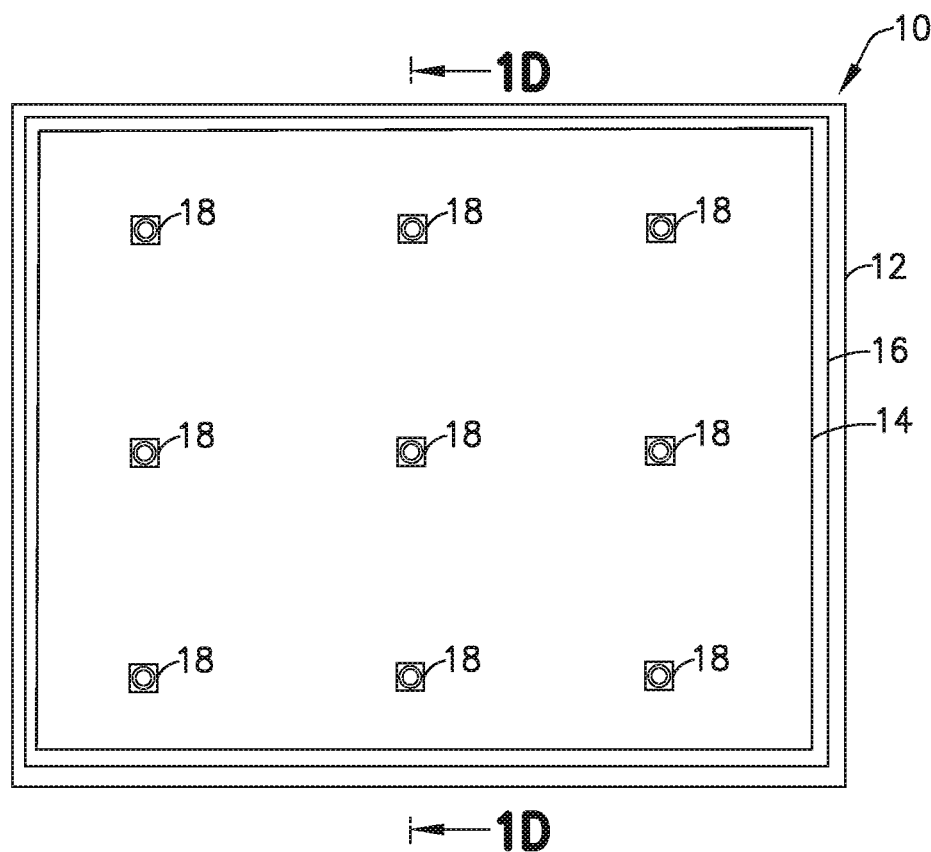
FIG. 1C is a top view of another embodiment of a substrate covered by a cured coating including sensors of a radio frequency signaling system positioned in the coating.
Figure 1D:
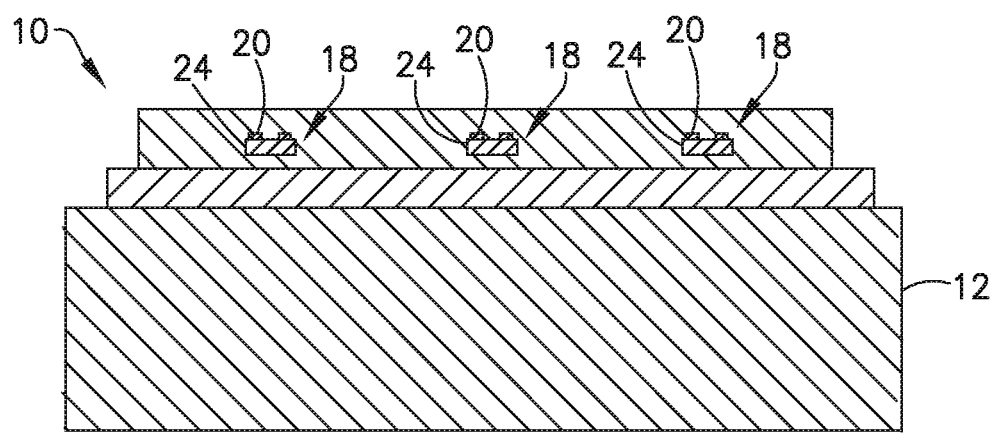
FIG. 1D is a cross-sectional view of the substrate of FIG. 1C taken along line 1D-1D.

The sensors 18 can also be individually and independently positioned in the curable coating composition after the curable coating composition is applied to the substrate 10, but before the curable coating composition cures to form the coating 14. In particular, the sensors 18 can be individually pressed into a soft coating before it hardens so that placement of the sensors 18 in the coating can be controlled. The sensors 18 can be positioned on a surface of the substrate 10 according to a predetermined pattern, such as a grid or matrix pattern. Sensors 18 can be equidistantly spaced across a surface of the cured coating 14. A substrate 10 including sensors 18 placed on the substrate surface to form a matrix of equidistantly spaced apart sensors is shown in FIGS. 1C and 1D.

At least one non-conductive or insulating primer layer 16 may be applied to at least a portion of the substrate body 12, between the cured coating 14 and the substrate body 12. The primer layer 16 can be provided to electrically isolate the coating 14 from the substrate 10. An isolating primer layer (also referred to as an insulating layer), such as primer layer 16, may be desirable when the substrate body 12 is produced from a metal or another conductive material. Such primer layers 16 may be desirable when the radio frequency signaling system 100 disclosed herein is used to monitor a coating 14 on a vehicle (e.g., an aircraft fuselage, automobile body, or ship hull). The primer 16 can also be applied to an inner surface of a container between the coating 14 and substrate body 12. In particular, primers 16 can be applied to surfaces of storage, transport, ballast tank, or to pipelines. Electrical conductivity of the substrate body 12 can affect permittivity of the coating 14 and a resonant frequency detected by the sensors 18 in the coating 14. In particular, placing the coating 14 in electrical contact with a conductive surface or sheet may increase permittivity of the coating 14, making it more difficult to identify changes in resonant frequency caused by degradation or corrosion of the coating 14.

Figure 1E:
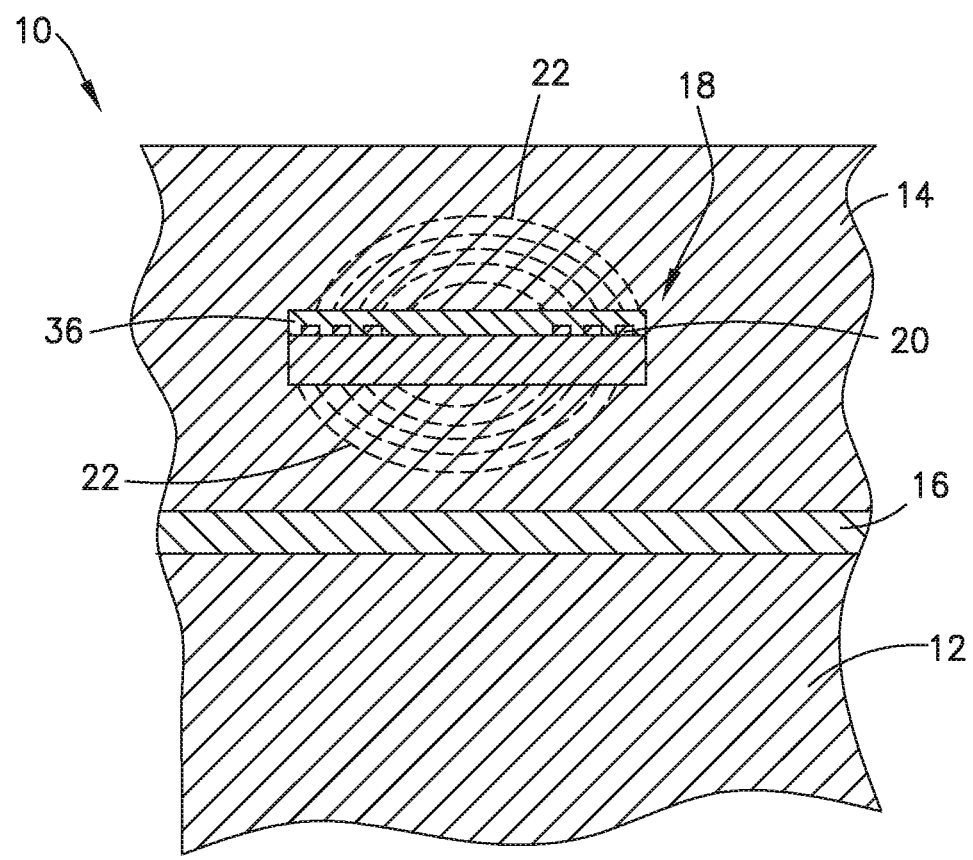
FIG. 1E is a schematic drawing of a cross-sectional view of the substrate of FIG. 1A showing an electromagnetic field extending from a radio frequency sensor.

The system 100 also includes the sensors 18 positioned or embedded in the cured coating 14 positioned on the substrate 10. As used herein, an embedded sensor 18 may be enclosed or encased on all sides by the coating 14, as shown in FIGS. 1B and 1D. Alternatively, the sensors 18 may be positioned between separately cured layers of a multi-layer cured coating 14. As discussed previously, the sensor 18 can be a radio frequency sensor configured to activate when exposed to a radio frequency signal. The sensor 18 includes circuitry 20 arranged to form an inductor-capacitor (LC), e.g., a resonant or tuned, circuit. In response to an external radio frequency signal, such as an external radio signal generated by an RFID scanner, reader, detector, or signal generator, electric current is induced to pass through the circuitry 20, thereby generating an electromagnetic field extending from the circuitry 20 into the cured coating 14. A schematic drawing showing the generated electromagnetic field (shown by field lines 22) promulgating from sensor circuitry into the cured coating 14 is shown in FIG. 1E.

Radio Frequency Sensors

With reference to FIGS. 1B and 1D, as well as FIGS. 2A-3B, aspects of the radio frequency sensors 18 of the present disclosure will be described in detail. The sensors 18 include the circuitry 20, which can include loops, coils, interdigitating segments, zig-zag segments, wave-like segments, and similar arrangements. The circuitry 20 extends over a body 24 of the sensor 18 to create a resonant LC (inductor-capacitor) circuit. As used herein, an LC circuit can refer to a circuit that acts as an electrical resonator by storing energy oscillating at the circuit's resonant frequency. The inductance of the circuitry 20 is based on positioning of loops, coils, or interdigitating capacitors of the circuitry 20. For a sensor 18 including coils or loops, inductance can be dependent on a number of turns in the coil and the dimensions of the coil. The capacitance of the circuitry 20 can be due to the capacitance between the individual turns of the coil and can be augmented with interdigitating finger capacitors. The capacitance can include or produce a fringing component due to the electric field lines 22 (shown in FIG. 1E), extending in curved arcs above and below the plane of the metal coil. The fringing capacitance component penetrates into the coating 14. Changes in dielectric properties of the coating 14 affects how the electromagnetic field passes through the coating 14, which in turn affects electrical performance of the resonant circuitry 20. As discussed herein, electrical performance of the circuitry is measured to determine information about a condition of the coating 14.

The system 100 can include any of a variety of different types, sizes, and arrangements of sensors 18. As discussed previously, the sensors 18 can be any size suitable for use on the article being coated and/or of suitable size to be positioned in the coating 14. In order to improve appearance, desirably, such sensors 18 are small enough to be inconspicuous or not easily seen in finished articles or structures. Further, in order to disperse the sensors 18 in a curable coating composition or solution so that the sensors 18 can be painted or deposited on a substrate 10, the sensors 18 should be small enough to disperse within the curable coating composition.

Suitable sensors that can be used with the system 100 disclosed herein are shown schematically in FIGS. 2A-3B. The sensors 18 include the sensor body 24 having a top or first surface 26 and a bottom or second surface 28. The sensor body 24 can be formed from a silicon substrate or wafer and can be similar in thickness to a standard microprocessor or computer chip. The opposing surfaces 26, 28 can have a major dimension or maximum length of from 10 µm to 2.0 mm. As used herein, a "major dimension" or "maximum length" refers to a longest straight-line distance D1 (shown in FIGS. 2A and 3A) between edges of the sensor body 24 passing through a center point 30 of the sensor body 24. For a circle, the "major dimension" or "maximum length" is a diameter of the circle. For a square or rectangle, a "major dimension" is a distance between corners of the square or rectangle. A thickness of the sensors 18 can also vary widely based on intended use of the sensor 18 and how the sensor 18 is formed.

The circuitry 20 includes conductive members 32 positioned on the sensor body 24. The conductive members 32 can have a width of 0.01 µm-1.0 µm. Various arrangements of conductive members 32 are known for forming an LC circuit on a flat substrate or sensor body 24. The circuitry 20 can have a maximum dimension, maximum length, or maximum outer diameter of 10 µm-2.0 mm. As used herein, the maximum dimension, maximum length, or maximum diameter of the circuitry 20 refers to a longest straight-line distance D2 between points on an imaginary or virtual shape 34 enclosing the conductive members 32 passing through the center point 30 of the shape 34. In cases where the circuitry 20 extends all the way to the edge or periphery of the sensor body 24, the maximum dimension of the sensor body 24 can be substantially the same as the maximum dimension of the circuitry 20. For sensors 18 in which the circuitry 20 is provided in a pattern that does not extend to the edges of the sensor body 24, the maximum dimension of the circuitry 20 can be less than the maximum dimension of the sensor body 24.

The conductive members 32 of the circuitry 20 can be formed on, affixed to, or mounted on the first surface 26 or the second surface 28 of the sensor body 24 in any convenient manner, as is known in the art. Circuitry 20 can be deposited on the body 24 using a printing process or soldering process as is known in the art. Circuitry 20 can also be formed on the sensor body 24 by an etching process, as used for forming certain semiconductor devices, as are known in the art. Also, circuitry 20 can be provided on the surfaces 26, 28 by various known chemical deposition processes. The circuitry 20 can also comprise a plurality of wires or other conductive members 24 adhered or fastened to the surfaces 26, 28 of the sensor body 24 to form the circuitry 20. In most cases, the conductive members 32 are not enclosed within a casing or otherwise isolated from the sensor body 24. Instead, circuitry 20 is generally deposited on a surface of the sensor body 24 and, once positioned in the cured coating 14, can be in direct electrical contact with a portion of the cured coating 14.

Alternatively, some portions of the sensor 18 can include protective layers 36 covering at least a portion of the first surface 26 of the sensor body 18 and the conductive members 32 of the circuitry 20. The protective layers 36 can be a cured polymer layer covering the sensor body 24, which is separate from and effectively isolates portions of the sensor body 24 from the cured coating 14. The protective layers 36 may not be conductive and, accordingly, do not affect an electrical signal emitted from the circuitry 20 and penetrating into the cured coating 14. More specifically, since the protective layer 36 does not affect a signal emitted from the sensor 18, the electromagnetic field generated by the sensor circuitry 20 can include the fringing component (shown by lines 22 in FIG. 1E) generated by the circuitry 20 extending above the protective layer 36. As discussed previously, a schematic representation of the electromagnetic field (field lines 22) penetrating into the coating 14 is shown in FIG. 1E. Upon curing of the curable coating 14, the fringing component of the field at least partially penetrates into the cured coating 14 and passes through the coating 14 in a manner dependent upon dielectric properties of the coating 14.

Figure 2A:
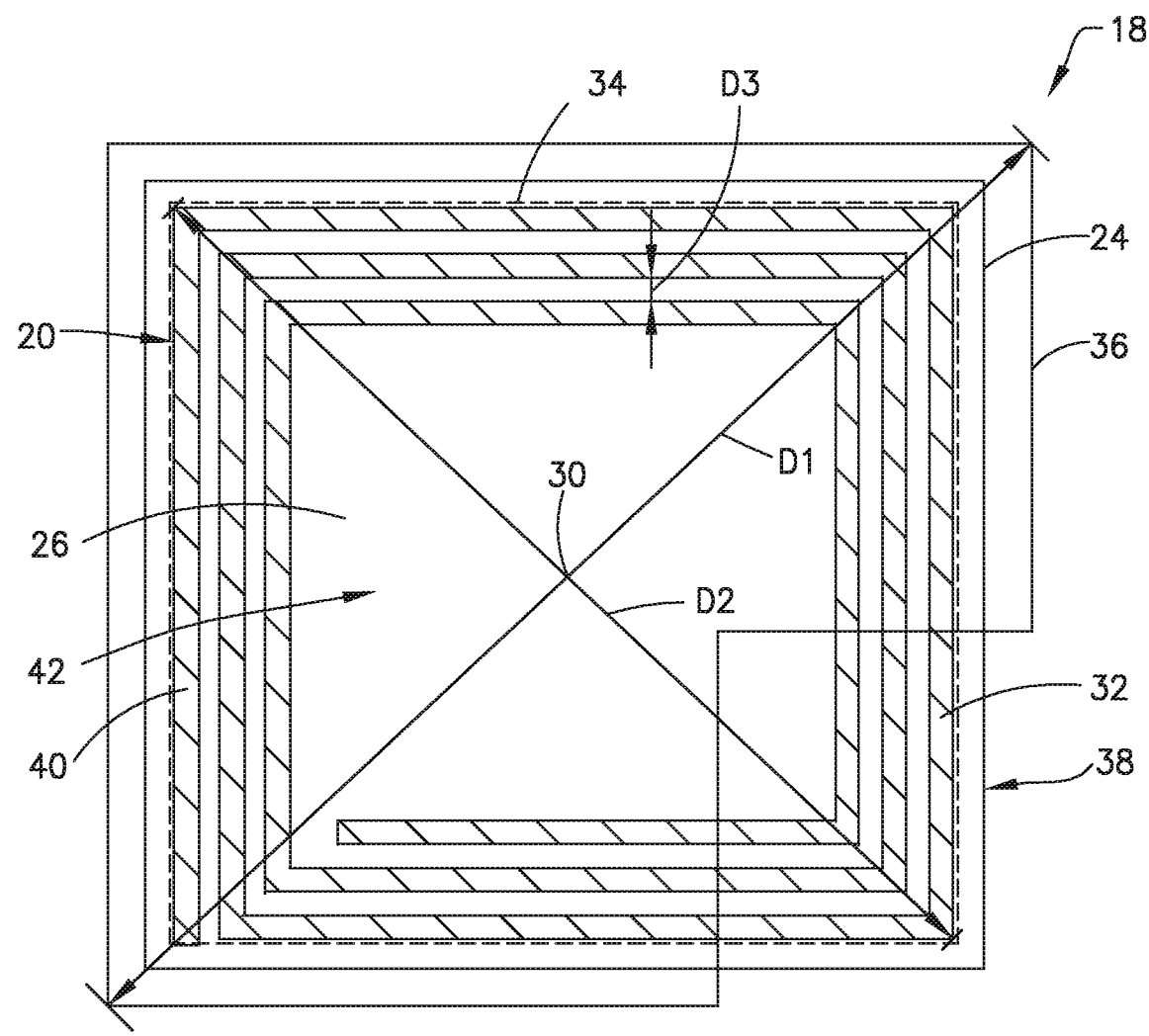
FIG. 2A is a schematic drawing of a radio frequency sensor of a radio frequency signaling system.
Figure 2B:
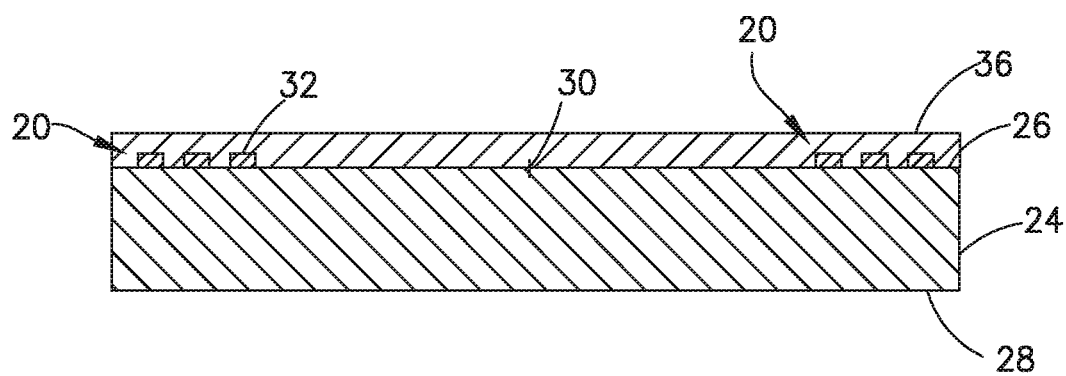
FIG. 2B is a schematic drawing showing a cross-sectional view of the sensor of FIG. 2A.
Figure 3A:
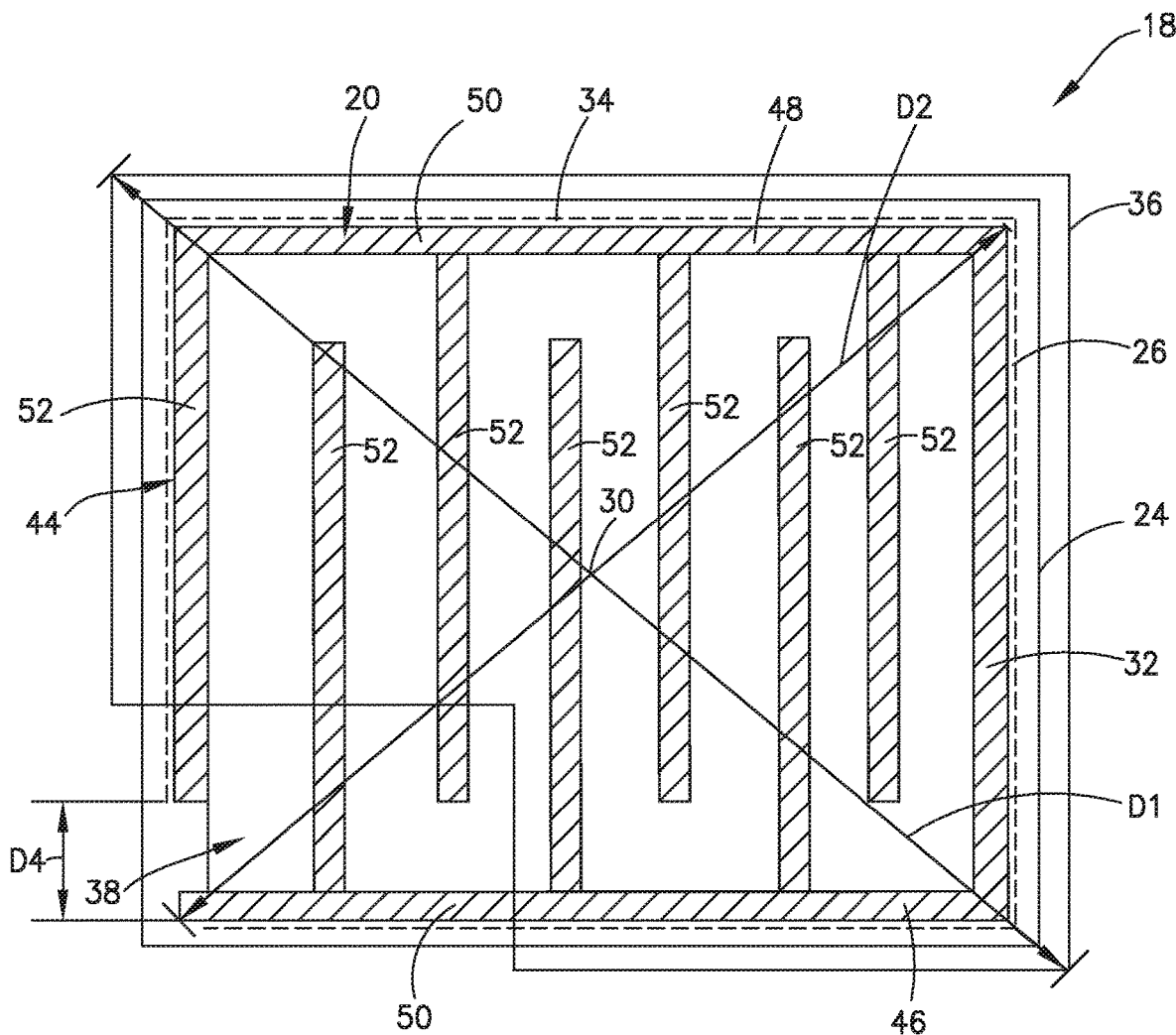
FIG. 3A is a schematic drawing of another radio frequency sensor of a radio frequency signaling system.

The sensor 18 can also include uncovered portions, shown generally at reference number 38 in FIGS. 2A and 3A. As used herein, "uncovered portions" refers to circuitry that is not covered by a protective layer, such as the protective layer 36, and is in direct electrical contact with the cured coating 14. While not intending to be bound by theory, it is believed that including a portion of circuitry 20 in direct contact with the coating 14 improves a quality of signal received from the circuitry 20. Improving a quality of the received signal can increase a sensitivity of the sensor 18 and/or can remove background noise present in received signals, meaning that the resonant characteristics of the LC circuit can be measured more accurately than if the entire sensor 18 was covered. Increased sensor sensitivity can make identification of changes in resonant characteristics of the LC circuit over time easier to detect and quantify.

FIGS. 2A-3B show circuitry patterns that can be provided on the sensors 18. As shown in FIGS. 2A and 2B, the circuitry 20 can include a plurality of connected conductive loops or coils 40 extending around at least a portion of the first surface 26 of the sensor body 24. The loops or coils 40 can be circular, square shaped, rectangular, or any other convenient shape. The loops 40 can be concentric, extending around the center point 30 of the sensor body 24 and near or adjacent to a periphery of the sensor body 24. The loops or coils 40 can be separated by a distance D3 which, as discussed previously, is related to a capacitance of the circuitry 20. The inductance of the circuitry 20 is related to the number of loops or coils 40. The sensor 18 can include two, four, eight, or more loops 40, depending on inductance needed to obtain suitable measurements using the sensors 18. As discussed previously, the circuitry 20 can have a maximum length D2 or outer diameter of 10 µm-2.0 mm. A central portion 42 of the sensor body 24 can either be free from conductive members 32 and circuitry 20 or can include a plurality of segments, such as interdigitating capacitor circuits, extending across the surface of a central portion 42 of the sensor body 24.

Figure 3B:
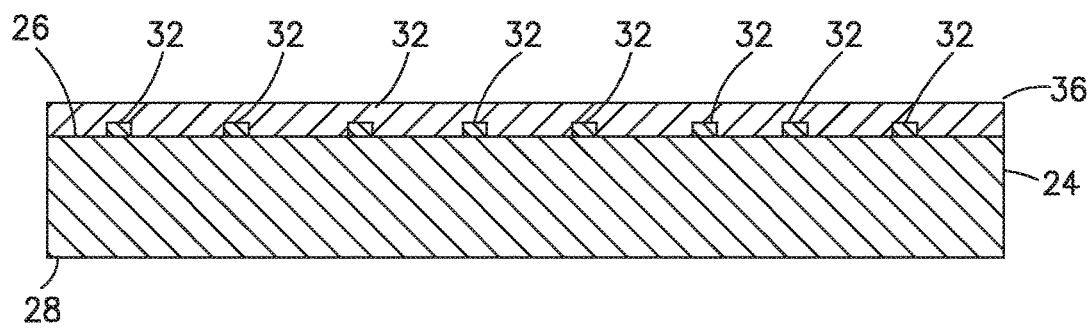
FIG. 3B is a schematic drawing of a cross-sectional view of the sensor of FIG. 3A.

As shown in FIGS. 3A and 3B, the loops 40 are replaced by a plurality of interdigitating capacitors 44 extending inwardly from sides of the sensor body 24. The interdigitating capacitors 44 include a positive or first lead 46 and a negative or second lead 48 extending across opposing portions of the sensor body 24. The leads 46, 48 comprise opposing ends separated by a gap of distance D4, which relates to a capacitance of the circuitry 20. The leads 46, 48 each include first connecting portions or segments 50 extending generally about a periphery of the sensor body 24. The leads 46, 48 also include second segments 52 extending from the first connecting portions 50 of the leads inwardly over at least a portion of the central portion 42 of the sensor body 24. The first segments 50 can, optionally, be longer than the second segments 52. The second segments 52 are arranged to alternate across the central portion 42 of the sensor body 24, such that a segment 52 extending from the first or positive lead 46 is positioned between two segments 52 extending from the negative or second lead 48. The sensor 18 can include two, four, six, or more interdigitating segments 52. The number of interdigitating segments 52 affects inductance of the circuitry 20.

Radio Frequency Signaling System

Figure 4:
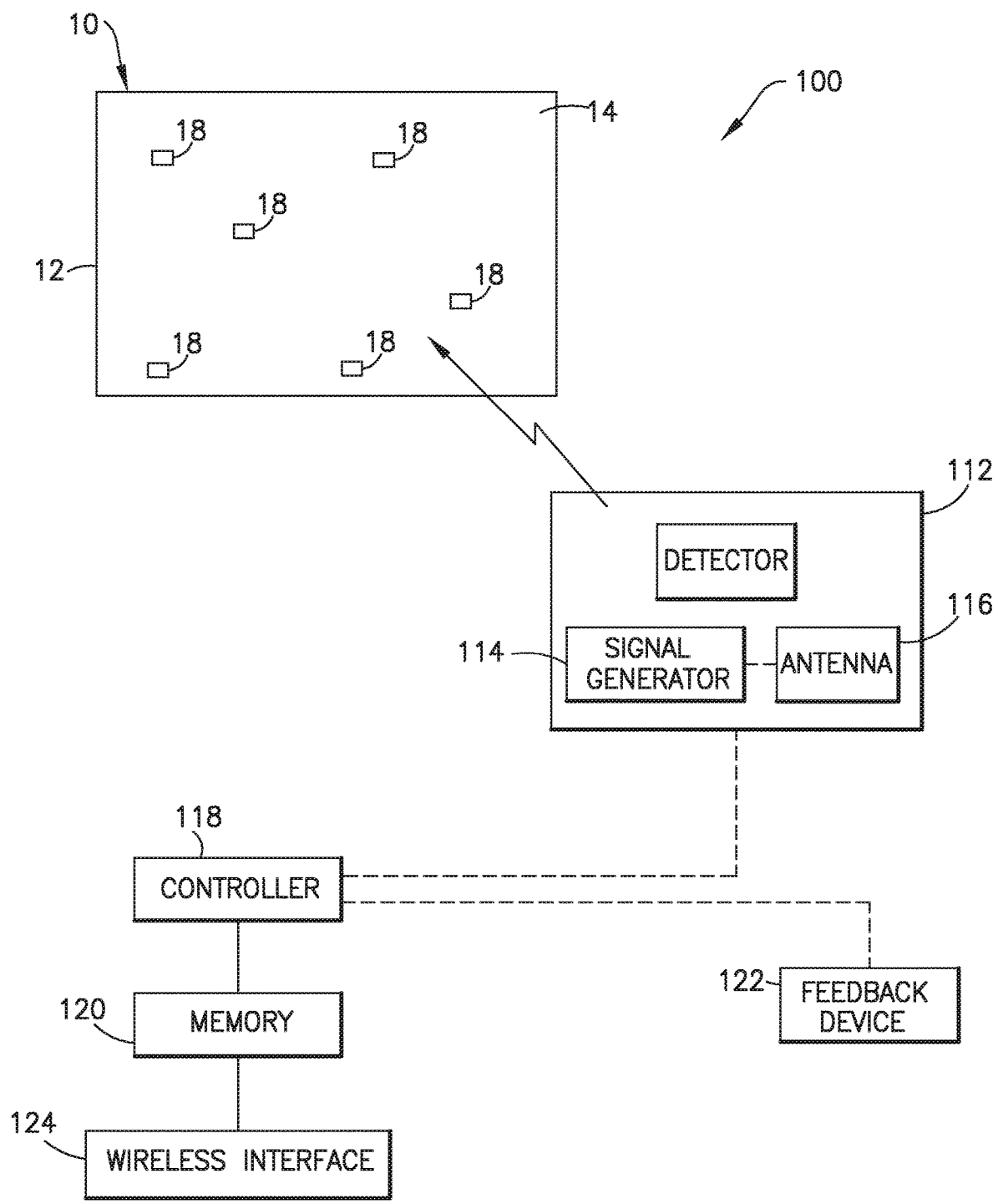
FIG. 4 is a schematic drawing of a radio frequency signaling system including radio frequency sensors attached to a substrate.

With reference to FIG. 4, features of the radio frequency signaling system 100 including the sensors 18 for monitoring a condition of the coating 14 are shown and described. As discussed previously, the sensors 18 are positioned in the cured coating 14. The sensors 18 can be individually placed at predetermined locations on a surface of the coated article or substrate 12, or can be randomly dispersed within the coating 14 as occurs when the curable coating composition containing sensors 18 is painted or otherwise deposited onto the surface of the substrate body 12.

The system 100 also includes at least one radio frequency scanner, reader, interrogator, detector, or monitor, referred to collectively herein as a detector 112, including a radio frequency generator 114 and a radio frequency antenna 116. Radio frequency devices, such as the detector 112, are known and widely available from a number of different electronics manufacturers. The radio frequency generator 114 is configured to generate a radio frequency signal and to direct the radio frequency signal toward portions of the cured coating 14 and, in particular, toward the sensors 18 positioned therein. A frequency of the radio frequency signal from the generator 114 can be determined based on characteristics of the sensor circuitry 20 and, in particular, based on a resonant frequency of the LC circuit. In general, the radio frequency signal can be a low frequency signal ranging from 120 kHz to 150 kHz. High frequency signals ranging from 10 MHz to 20 MHz can also be used for some applications. The radio frequency signal is desirably of sufficient power or gain to penetrate portions of the coating 14 to activate the sensors 18.

As discussed previously, the radio frequency signal produced by the generator 114 induces a flow of electrical current through the circuitry 20 of the sensor 18, which produces the electromagnetic field. The electromagnetic field should be of sufficient power to extend from the sensor body 24 through the protective layer 36, if present, and into the cured coating 14. As discussed previously, since the electromagnetic field passes through the cured coating 14, dielectric properties of the coating 14 affect the electromagnetic field and the resonant frequency of the LC circuit. A response signal from the sensor 18 determined by or representative of the resonant frequency of the LC circuit is detected by the antenna 116 of the detector 112. The detected response signal can be processed and analyzed to determine information about the condition of the coating 14. In particular, as discussed previously, changes in resonant characteristics of the coating 14 can indicate that the coating is corroding, has been damaged, or has absorbed certain materials that affect properties of the coating 14.

The detector 112 can be a hand-held and/or portable device that is brought into proximity to the cured coating to activate the sensors 18. In that case, maintenance personnel or other users may move the handheld or portable detector 112 over the surface of the coating 14 periodically to scan the coating 14 to determine information about the condition of the coating 14.

Alternatively, the system 100 can include one or more detectors 112 mounted in a fixed location in proximity to the cured coating 14 and configured to continually or periodically apply the radio frequency signal to the coated article and sensor 18 to detect the response signal from the sensor 18. The fixed detectors 112 can be mounted on a frame or fuselage of a coated article in proximity to a portion of the coating 14 to be monitored. According to a predetermined schedule or in response to a received activation signal, the detector 112 and radio frequency generator 114 may by turned on to direct the radio frequency signal toward the portion of the coating 14. Signals or instructions sent to the detector 112 and radio frequency generator 114 may also be used to aim or reposition the radio frequency signal from the generator 112 to ensure that certain portions of the coating 14 and sensors 18 positioned therein are exposed to the radio frequency signal. Alternatively or in addition, fixed detectors 112 can be positioned on frames, arches, posts, or similar structures near to the objects or coated articles being monitored. For radio frequency systems 100 configured to monitor vehicles and similar movable objects, detectors 112 can be placed at a fixed position near a road or railway. In that case, vehicles may pass near the detectors 112 for interrogating sensors 18 and determining information about the coatings 14 of the vehicles.

The system 100 can further include a controller 118 in electrical communication with the one or more detectors 112. The controller 118 can be configured to provide instructions to the detector 112 for activating the signal generator 114 and detecting the frequency response of sensors 18 in the conductive coating 14. The controller 118 can be a computer processor or controller of the detector 112. In that case, the controller 118 can be enclosed within a housing of the detector 112 and can be electrically connected to and configured to control operation of the signal generator 114 and the antenna 116. The controller 118 can also be a processor of another type of portable electronic device, such as a computer tablet, smart phone, or laptop computer in electronic communication with the detector 112.

Alternatively or in addition, the controller 118 can be a processor or controller of a separate electronic device in wired or wireless electronic communication with the detector 112 and the radio frequency generator 114. The controller 118 can be a controller of a vehicle and, in that case, can be associated with other vehicle systems including an electronics monitoring system, security system, navigation system, or other vehicle systems, as are known in the art. If the coated article is a building, the controller 118 can be associated with other building systems, such as a building HVAC system, environmental monitoring system, security systems, electrical system, or other utility system.

Regardless of where it is located, the controller 118 can be configured to control operation of the detector 112 by controlling when the radio frequency signal is applied to the coating 14 and detecting the response signal received from circuitry 20 of the one or more sensors 18 positioned in the coating 14. The controller 118 can be configured to cause the signal generator to apply the radio frequency signal to the coating 14 and sensors 18 according to a variety of different use patterns. The controller 118 can cause the radio frequency signal to be applied continually or periodically according to a predetermined pattern, such as hourly, every 12 hours, or daily. Alternatively, the controller 118 can be configured to check the condition of the coating 14 in response to a request or instruction received by the detector 112. The request can be generated automatically by a computing device, such as a vehicle or building monitoring or security system. The request may also be entered manually by a technician, maintenance personnel, or others responsible for a condition of the coating 14.

The controller 118 is further configured to identify changes in dielectric properties of the cured coating 14 based on the information received from the sensors 18. As described in further detail herein, detecting the response signal may include receiving the response signal from the antenna 116, processing the received signal to remove signal noise and prepare the received signal for analysis, storing the received signal in memory 120 associated with the controller 118, and analyzing the received signal. Analyzing the signal can include determining a resonant frequency of the received signal. Analysis of the signal can also include comparing the determined resonant frequency to known or experimentally derived frequencies representative of a condition of the coating 14. The analysis can also include identifying changes in the detected resonant frequency over time which indicate a change in the condition of the coating 14 over time.

Based on the analysis, the controller 118 can be configured to provide feedback about the condition of the coating 14. Feedback can be provided on a dedicated feedback device 122, such as a computer, smart phone, or tablet, in wired or wireless communication with the controller 118. The controller 118 can also be integrated or electrically coupled to a communications interface 124. In that case, the controller 118 can be configured to transmit feedback regarding a condition of the coating 14 to remote devices via the communications interface 124. The feedback provided by the feedback device 122 can be provided as numerical values indicating characteristics of the entire coating 14, such as a numerical value indicating a remaining useable life of the coating 14. Feedback may also be provided for specific regions or portions of the coating 14 determined by comparing received signals from sensors 18 at different positions on the coating 14. Such feedback can include graphical representations of the coating 14 or coated article showing areas which have suffered damage and/or where corrosion has been identified. The graphical representation may also show areas of the coating 14 or coated article that are still in usable condition.

Coating Monitoring Methods

Having described the sensor 18 and radio frequency system 100, processes for monitoring a condition of the coating with the sensors 18 will now be described in detail. The processes can be computer implemented processes performed by one or more controllers 118 of the system 100. In some cases, the processes described herein can be performed by a single processor, such as a processor of a handheld detector 112. In other cases, processing can be distributed between multiple processors, such as processors of the detector 112, other portable computer devices (e.g., a smart phone or tablet in communication with the detector), as well as various remote computer systems and networks.

Figure 5:
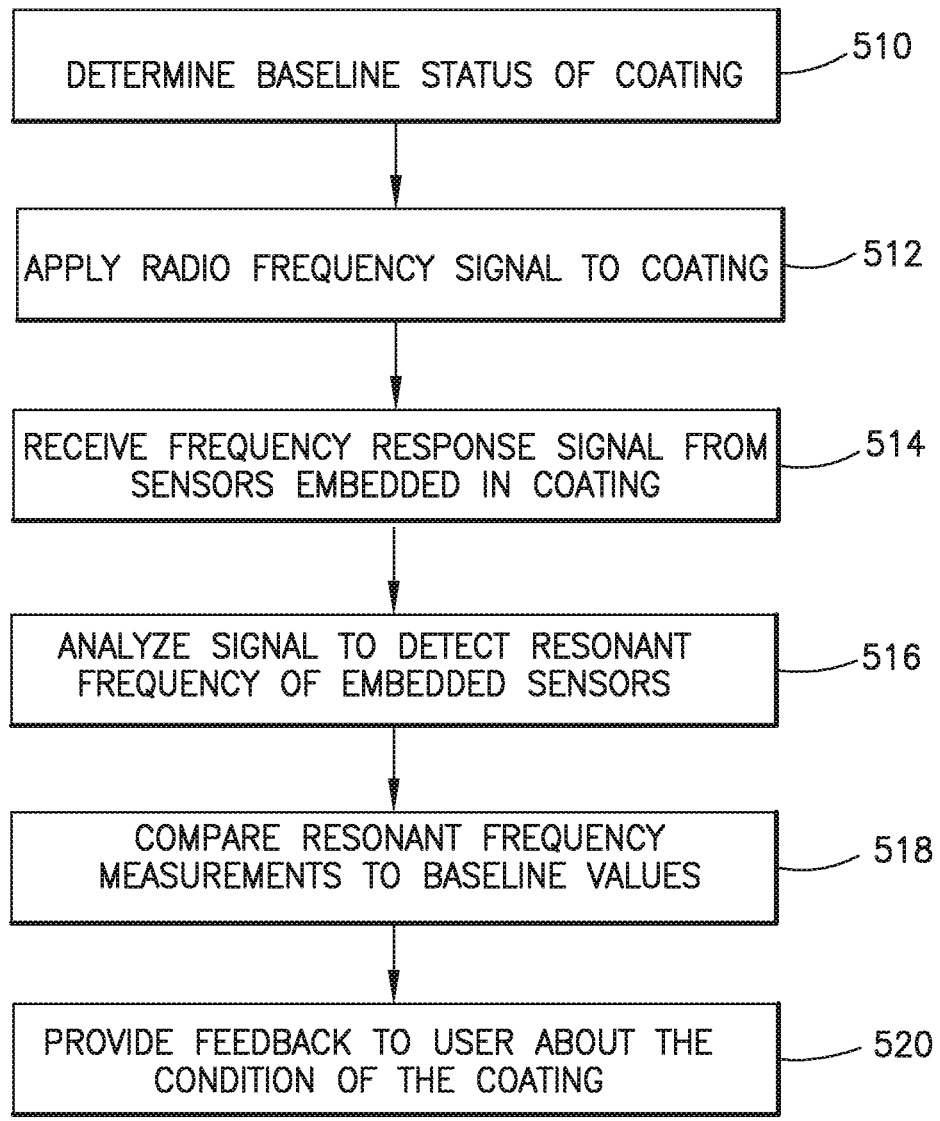
FIG. 5 is a flow chart showing a method for monitoring a coating based on signals received from radio frequency sensors of a radio frequency signaling system.

A flow chart showing steps for such a process is shown in FIG. 5. At step 510, the process can include determining a baseline state for the coating 14. The baseline state can include information representative of dielectric properties of the coating 14 and, in particular, can include a resonant frequency of the sensors 18 prior to deterioration or corrosion of the coating 14. Determining the baseline state can be performed shortly after the coating 14 is formed. Determining the baseline state may be performed at a manufacturing facility or by maintenance personnel shortly after a coated article is provided to a customer. Generally, determining the baseline frequency includes executing a program or instructions on the controller 118 which cause the radio frequency generator of the detector 112 to generate and provide a radio frequency signal to at least a portion of the cured coating 14. The provided signal should be of sufficient power or gain to induce current flow through circuitry 20 of one or more of the sensors 18, which causes the circuitry 20 to generate an electromagnetic field extending from the circuitry 20 into the cured coating 14. The detector 112 measures a frequency response of the circuitry 20 to determine the resonant frequency of the sensor 18. A resonant frequency can be determined and recorded for each sensor 18 positioned in the coating 14. Alternatively, determining the baseline status may include determining an average resonant frequency value for the sensors 18 positioned in the coating 14.

After the baseline state or value is known, the frequency response or resonant characteristics of the sensors 18 can be monitored as the coated article is in use. Monitoring the sensors 18 and coating 14 can include, at step 512, applying the radio frequency signal to the coating 14 and sensors 18 to induce the electromagnetic field and frequency response. As discussed previously, the radio frequency signal can be applied either manually by periodically moving the portable handheld detector 112 over a surface of the coating 14 to scan or interrogate the sensors 18 positioned in the coating 14. The coating 14 can be manually scanned or interrogated by maintenance personnel each time that the coated article is scheduled for maintenance. Alternatively, the radio frequency signal may be applied continually or periodically from detectors 112 fixed in place in proximity to the coating 14, as described previously.

At step 514, a signal representative of the frequency response of the coating is received and processed by the controller 118 and/or by other electronic devices of the system 100. Specifically, the response signal can be received by the antenna 116 of the detector 112. The received signal can be processed by a controller 118 of the detector 112 or another controller or processor to remove signal noise and perform any other processing needed to put the received signal in better form for analysis.

At step 516, the processed signal is analyzed to identify or calculate the resonant frequency of the sensor circuitry 20. A resonant frequency for each sensor 18 in the coating 14 can be calculated and recorded in the memory 120 associated with the detector 112 or another electronic device. Alternatively or in addition, a mean or median average resonant frequency for any or all of the sensors 18 in the coating 14 may be calculated from the received and processed response signals.

At step 518, the determined resonant frequency for one or more of the sensors 18 is compared either to the baseline resonant frequency values or to other predetermined values to determine information about the condition of the coating 14. Comparing determined values to baseline values can be performed to determine changes of the resonant frequency over time. As discussed previously, it is believed that an increase in permittivity of the coating 14, evidenced by a decrease in the resonant frequency of the sensors 18, indicates a deterioration of a condition of the coating 14. The system 100 can be configured to monitor the difference between the measured resonant frequency and baseline values over time, and to provide notifications to users when the change exceeds a predetermined percentage or absolute amount.

In other cases, the measured resonant frequency values can be compared to predetermined values, such as predetermined values on a calibration curve or stored in a lookup table. The predetermined values can correspond to a resonant frequency of a coating at different levels or degrees of deterioration. The predetermined values can be experimentally calculated values determined by analyzing other coatings and sensors. The predetermined values may also be estimated values, such as estimated values for when a coating is near failure and should no longer be used. In such cases, the measured resonant frequency values can be compared to the estimated values or to other predetermined values. A notification can be provided to users when the measured resonant frequency drops below one of the predetermined values.

At step 520, feedback can be provided to users about the condition of the coating 14. The feedback can be based on results of the comparisons between the measured resonant frequency values and either the baseline values or the predetermined values (e.g., values on the calibration curve for the coating). Feedback can be provided to a variety of different types of users depending on the article being monitored including vehicle operators, maintenance personnel, manufacturers, and other interested parties. As discussed previously, the feedback can be in the form of numerical values, such as an estimated remaining usable life of the coated article. Feedback can also include visual representations of the coated article showing areas of the article that are corroding and/or are in need of repair. Feedback can also include notifications or alerts when a coating is near failure and/or when the coated article should no longer be used.

Articles Including Radio Frequency Sensors

Figure 6:
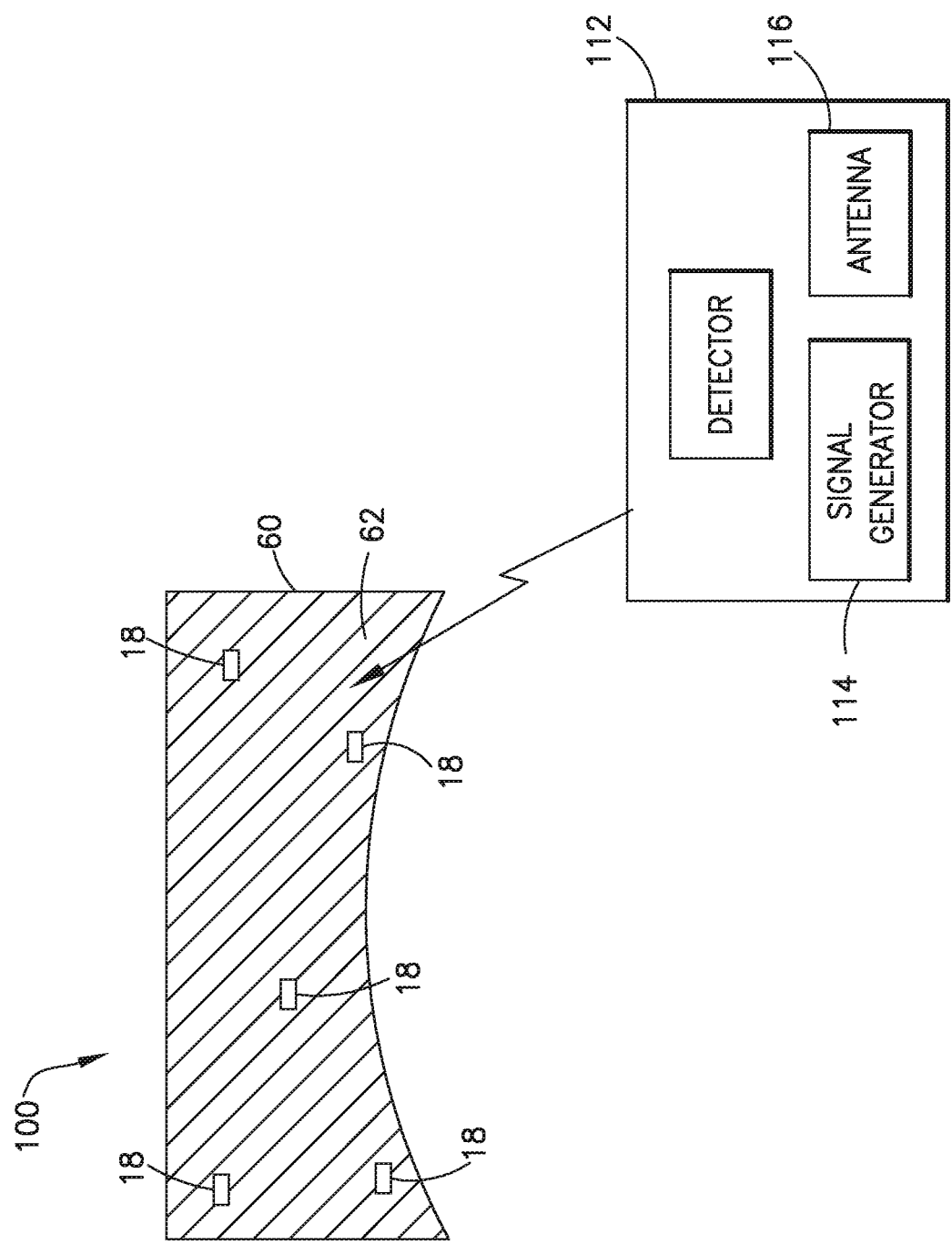
FIG. 6 is a schematic drawing of another embodiment of a radio frequency signaling system configured to measure dielectric properties of a molded article.

With reference to FIG. 6, a radio frequency signaling or monitoring system 100 can also be used for monitoring a condition of an article 60 formed from a dielectric material. The article 60 can be a molded article formed from a curable dielectric material introduced to a mold by any known convenient molding process and cured to form the article 60. The molded article 60 may be formed by rotational molding, injection molding, compression molding, extrusion molding, or by a hand lay-up process, as is known in the art.

The article 60 can also be manufactured by an additive manufacturing process, such as three-dimensional printing using a specially designed or commercially available three-dimensional printing machine. An article 60 formed by additive manufacturing can be formed by depositing a first layer of a curable composition onto a removable substrate. A sensor, such as any of the above-described radio frequency sensors 18, can be placed onto the first layer. A second layer formed from a same or another type of curable material can be deposited overlaying the first layer and the radio frequency sensors 18 to form the article 60.

The systems 100 disclosed herein can be adapted to be used with a variety of articles 60. The article 60 can be a part of a vehicle, such as a portion of a boat hull or airplane fuselage. Other articles 60 formed by the processes disclosed herein can include containers, portions of electronic devices, machines, and similar objects. In one specific implementation, the article 60 can be a molded vehicle transparency, such as an aircraft window or windshield. A method for forming a molded aircraft transparency is disclosed at column 6, line 58 to column 7, line 15 of U.S. Pat. No. 10,202,183, entitled "Deformable Aircraft Window," which is incorporated by reference herein in its entirety.

The article 60 includes a body comprising bulk material having dielectric properties. The bulk material can be a dielectric polymer. As was the case for the curable coatings described previously, the dielectric polymer can be a reaction mixture of monomers that polymerize to form the dielectric polymer. The dielectric polymer can comprise one or more of: epoxy, polyester, poly(methyl methacrylate), isocyanate, polyurethane, poly(ethylene terephthalate), and/or vinyl esters.

Radio frequency sensors 18 are positioned in the bulk dielectric material or body of the article 60 to monitor the condition of the article 60. A suitable number of sensors 18 for measuring characteristics of the article 60 may be mixed into a curable composition prior to introducing the curable composition into a mold. Once introduced into the mold, the composition can be cured to form the molded article 60 comprising cured bulk material 62 and sensors 18 positioned therein. Desirably, the sensors 18 are distributed randomly and substantially uniformly throughout the molded article 60 to provide information about a condition of substantially all portions of the molded article 60.

The sensors 18 are radio frequency sensors including any of the features previously described. In particular, the sensors 18 comprise the sensor body 24 and circuitry 20 forming an inductor-capacitor circuit, as previously described. The sensor circuitry 20 can be in direct contact with portions of the bulk material 62, or the sensors 18 can include one or more protective layers separating the sensor circuitry from the cured composition.

As discussed previously, the sensors 18 can be activated and interrogated by the radio frequency detector 112. In particular, the detector 112 can be configured to measure a response signal representative of the resonant frequency of the sensors 18. The received response signal can be analyzed by a controller 118 associated with and/or in electrical communication with the detector 112 to identify changes in resonant frequency of the sensor circuitry 20 over time. Changes in the resonant frequency can be representative of changes in the condition of the molded article 60. As discussed previously, the system 100 can be configured to provide feedback to users about the condition of the article 60 based on the measured changes in resonant frequency. Feedback can include alerts and notifications when an article 60 is no longer safe to use, as well as numeric representations about estimated remaining usable life of the molded article 60.

Container and Fluid Transporting Structures Having Radio Frequency Sensors

The radio frequency sensors and monitoring systems disclosed herein can be used to monitor coated surfaces of a container, such as on an inner surface and/or an outer surface of the container. The container can be a tank, such as a fuel, storage, transport, or ballast tank. The tank can be a free-standing structure, such as a stationary above-ground or below-ground land storage tank, or can be attached to a framework, housing, support structure, or to a vehicle, such as a rail car or fuel truck. The tank can be a fuel tank of a vehicle, such as an automobile, water vessel, or airplane. The container can also be an above-ground or below ground section of pipe or pipeline for conducting liquids over distances. The pipe or pipelines can comprise insulation, such as layers of insulation covering an outer surface of the pipe or pipeline.

Any of these container structures can comprise coated inner and/or outer surfaces to protect the structure from liquid chemicals contained therein. A "liquid chemical" can be a hydrocarbon or a liquid fuel, such as petroleum, gasoline, diesel, liquid propane, kerosene, and liquefied natural gas. A "liquid chemical" can also be another type of manufactured or naturally occurring chemical, such as methanol, fatty palm acids, acids, bases, toluene, and ethyl acetate, among others. The coated surfaces of the container, tank, or pipeline can be monitored using the sensor arrangements and monitoring systems disclosed herein.

Figure 7:
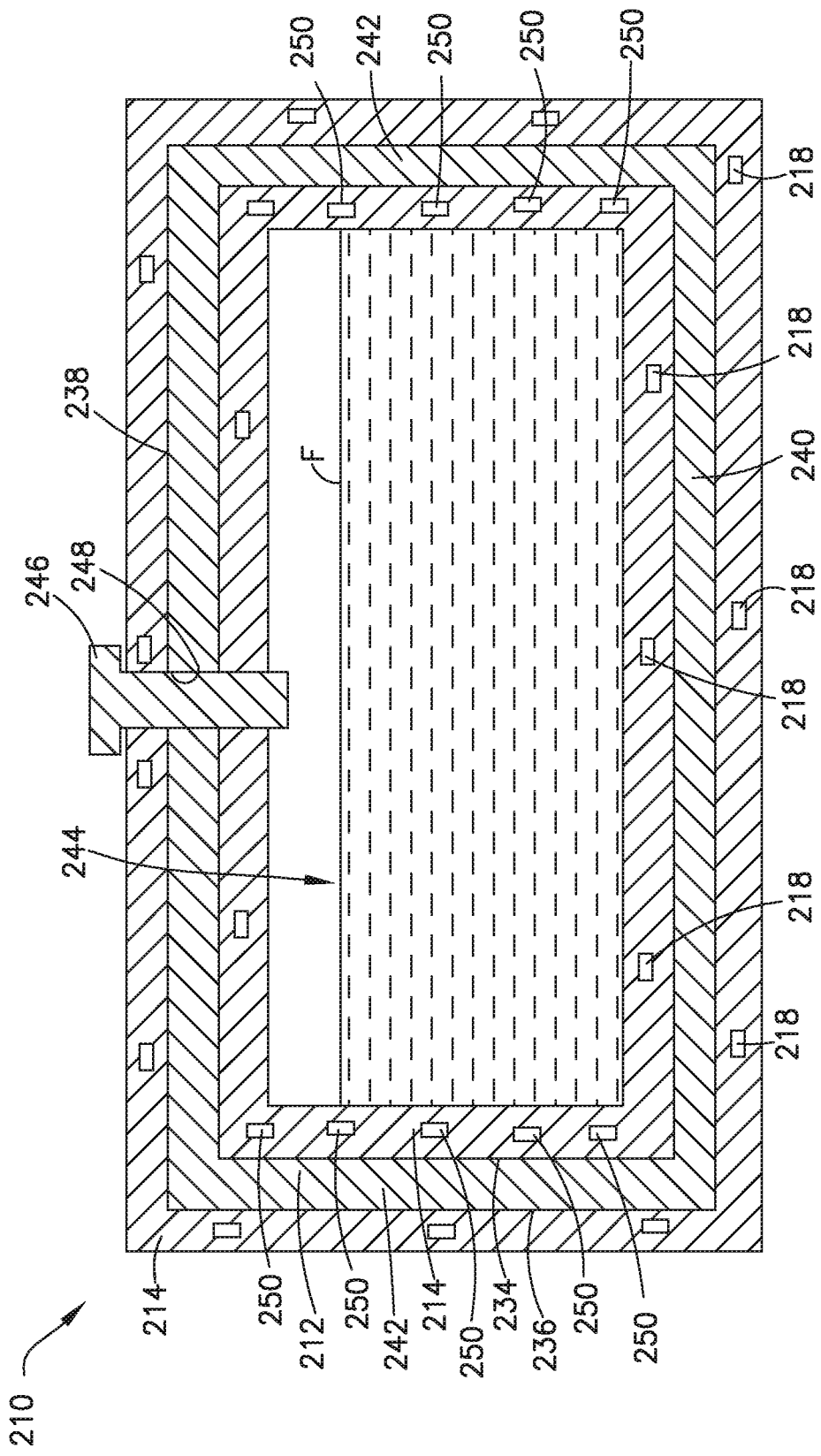
FIG. 7 is a schematic drawing of a cross-sectional view of a tank including a radio frequency signaling system.

With reference to FIG. 7, a container, such as a tank 210, including the sensors and monitoring components disclosed herein will now be described in detail. It is understood, however, that the tank 210 is merely exemplary of a type of coated article and/or coated container that can be monitored using the sensors and system disclosed herein. Other types of liquid containers, including, without limitation, the containers identified above, can also be monitored using the sensors and monitoring systems disclosed herein, as will be appreciated by those skilled in the art.

The tank 210 can comprise a wide range of shapes and volumes depending on the intended use and type of liquid chemical being transported. A fuel tank for a vehicle can have a volume of from 10 gallons to 100 gallons. A free-standing storage tank can have a volume of from 100 gallons to 1000 gallons or more. Tanks 210 can have a square or rectangular cross-section. The tank 210 can also be cylindrical, as is the case for a liquid transport tank configured to be mounted to a rail car or truck.

The tank 210 can comprise a lining or coating 214 to protect the tank body 212 from corrosive or aggressive materials or agents stored in the tank 210. The coating 214 or lining can be applied to any surface of the tank 210, including portions or all of the inner surface 234 and/or the outer surface 236 of the tank body 212. In order to counteract effects of corrosive or aggressive materials, some tanks 210 can include an inner chemical resistant coating 214 applied to protect the inner surface 234 of the tank 210 from chemicals. In many cases, a useful life of the tank 210 can be dependent on the stability and resistance to deterioration or wear of the interior chemical resistant coating 214.

The tank 210 can include a tank body 212 having an inner surface 234, an outer surface 236, a top 238, a bottom 240, and sides 242 extending between the top 238 and the bottom 240. The tank body 212 encloses an interior volume 244 or storage capacity for a liquid contained in the tank 210. The tank body 212 can be formed from any suitable material, including metals, plastics, and certain coated ceramic materials. The "suitable material" can be a non-porous material, which is inert and/or non-reactive with the liquids stored in the tank 210. The tank body 212 can be formed from a coated metal material, such as aluminum or steel, coated with a protective coating or lining, referred to herein as the cured coating 214. The cured coating 214 can be, without limitation, or more of: polyurethane, epoxy, polyester, poly(methyl methacrylate), isocyanate, polyurethane, poly(ethylene terephthalate), and/or vinyl esters. The coating 214 can be the PHENGUARD™ epoxy lining produced by PPG Protective and Marine Coatings.

The tank 210 can be an enclosed structure, which can include a removable cap 246 configured to seal an opening 248 of the tank 210 to create a fluid-tight sealed structure. The coating 214 can also be provided to prevent leaks through the body 212 and/or to prevent portions of the body 212 from corroding due to prolonged exposure to chemicals, moisture, humidity, and other aggressive agents. The tank 210 may also include a fluid port and valve configured to receive a nozzle for delivering fluid to and/or extracting fluid from the tank 210. The tank 210 may be connected to a network of fluid delivery pipes or conduits which deliver fluid to and extract fluid from the tank 210.

The tank 210 also includes the radio frequency sensors 218 positioned in the cured coating 214 for monitoring a condition of the cured coating 214. The sensors 218 can be similar or identical in size, structure, and configuration to sensors 18 described previously and shown in FIGS. 2A-3B. Particularly, the sensors 218 can be radio frequency sensors configured to, when activated by radio signals from a radio frequency detector 312 and generator 314, emit an electromagnetic field that penetrates into at least a portion of the cured coating 214. The sensors 218 can include circuitry 220 forming an inductor-capacitor circuit (LC circuit) having a maximum length or maximum outer diameter of 10 µm-2.0 mm. The system 300 monitors and detects changes in a resonant frequency of the sensor circuitry 220. Changes in the resonant frequency of the coating 214 can be representative of changes in dielectric properties of the coating 214 and of a deterioration in a condition of the coating 214. Dielectric properties of the coating 214 can also change as the coating 214 absorbs liquid and/or gasses, such as the liquid chemical stored in the tank 210. In the case of absorbed liquids and gasses, the changes in dielectric properties of the coating 214 can be reversible. In particular, dielectric properties of the coating 214 can return to previous levels once the coating 214 is ventilated for a period of time sufficient to allow absorbed liquid chemicals and gasses to vaporize or evaporate.

The sensors 218 can be positioned within the coating 214 in a variety of arrangements and orientations, depending on how information detected by the sensors 218 will be used. The sensors 218 can be positioned in the coating 214 on the inner surface 234 of the tank body 212 to monitor a condition of the tank coating 214 and, in particular, to monitor an amount of stored liquids and gasses absorbed by the coating 214. The sensors 218 can be randomly dispersed across the coating 214, as occurs when the sensors 218 are provided in a curable coating composition or solution, which is deposited on the tank body 212 and cured to form the cured coating 214. The sensors 218 can also be positioned on the inner surface 234 in a selected pattern or arrangement by placing each sensor 218 at a desired position on the inner surface 234 and allowing the curable coating composition to cure to form the cured coating 214.

Sensors 218 can also be mounted to and/or positioned on other portions of the tank body 212 to monitor other aspects of the tank 210. For tanks 210 designed for use outdoors or which are buried underground, the tank body 212 can include a coating 214 on the outer surface 236 of the tank body 212. In that case, sensors 218 can be used to monitor a condition of the outer coating 213. Sensors 218 can be positioned on the outer surface 236 of the body 212 to monitor a condition of a coating 214 applied to the outer surface 236 of the tank body 212. Such outer sensors 218 can also detect leaks from the tank 210. The sensors 218 can be randomly dispersed in the coating 214 as described previously. Alternatively or in addition, sensors 218 can be positioned at locations of particular interest on the tank 210, such as areas of the tank 210 likely to leak (e.g., near to the caps 246, ports, openings 248, and similar structures). Also, sensors 218 can be positioned near seams, joints, connections, and other areas of the tank body 212 where leaks have been known to form.

Additional radio frequency sensors 250 including features of the present disclosure can also be positioned on the inner surface 234 of the tank body 212 to measure a level of liquid or fluid F or a volume of fluid F in the tank 210. The additional sensors 250 may be positioned randomly or at discrete distances or depths from the top 238 of the tank 210, such as every 2 inches to 4 inches. Measurements from the sensors 218 can detect which of the additional sensors 250 are submerged by the fluid F contained in the tank 210 and which sensors 250 are not submerged. Based on this information, the fluid level and fluid volume for fluid F can be calculated.

Figure 8:
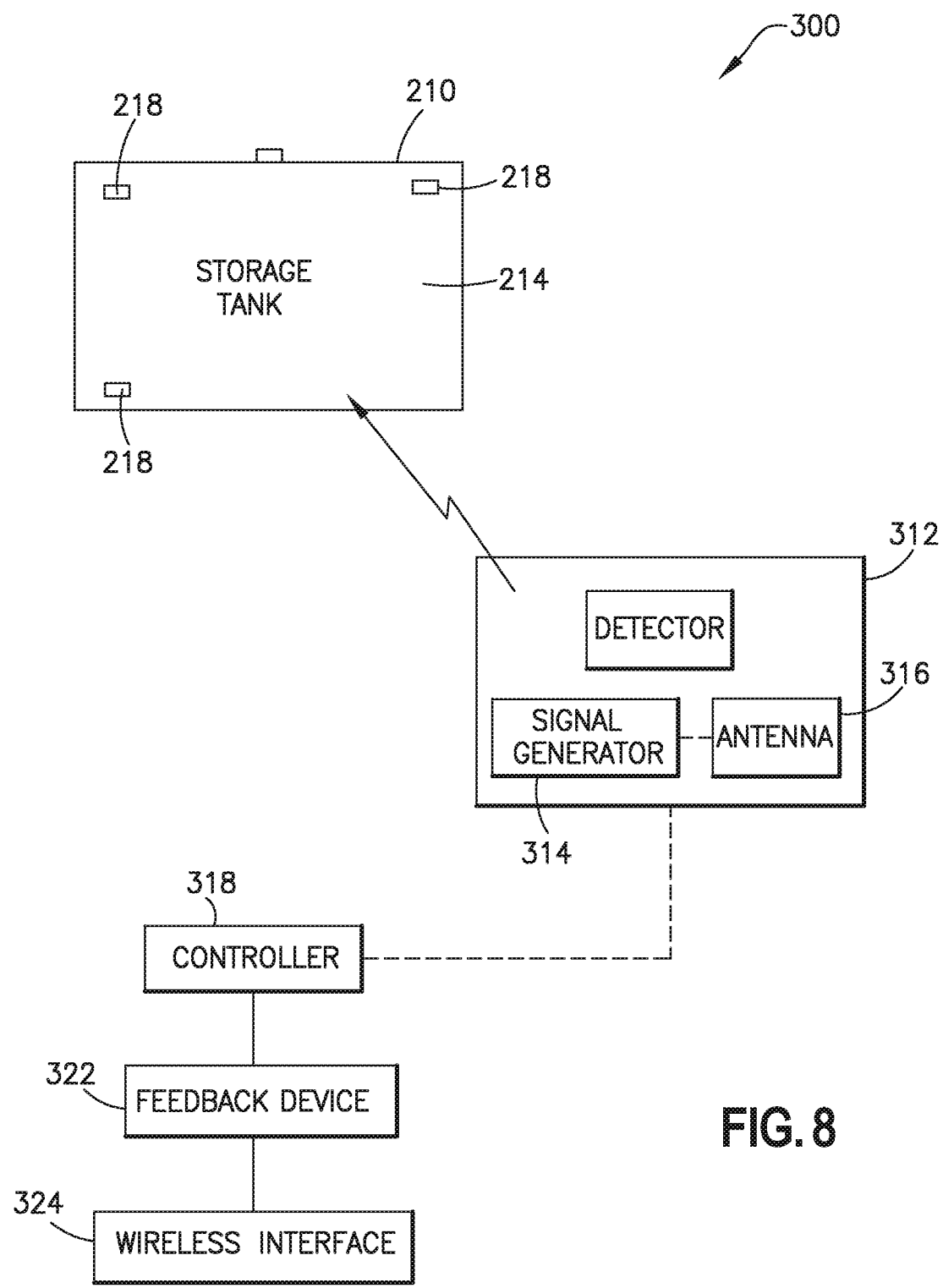
FIG. 8 is a schematic drawing of a radio frequency signaling system for a tank.

With reference to FIG. 8, the tank 210 can be adapted for use with a sensor monitoring system 300. As in previously described systems 100, the radio frequency signaling or monitoring system 300 includes the radio frequency scanner or detector 312 comprising the radio frequency generator 314 and antenna 316. As previously described, the signal generator 314 is configured to apply the radio frequency signal to the sensors 218, 250 positioned in the cured coating 214 of the tank 210. The antenna 216 is configured to detect response signals from the sensors 218, 250 which indicate the resonant frequency of the sensor circuitry 220 and dielectric properties of the cured coating 214. As previously described, the radio frequency detector 212 can be a handheld and/or portable device configured to be carried by an operator or maintenance personnel. In that case, the operator or maintenance personnel can perform periodic scans of the tank 210 to detect characteristics of the coating 214. Scans can be performed by moving the handheld and/or portable detector 312 over a surface of the tank 210. Desirably, a power or gain of the detector 312 is sufficient to activate and detect response signals for sensors 218 located on both the outer surface 236 and the inner surface 234 of the tank 210, while the detector 312 remains outside the tank 210.

The detector 312 can also be fixed to either the tank 210 or another structure. The detector 312 can be mounted to a frame or support adjacent to the tank 210, such as a frame or support positioned near a road or railroad tracks. In that case, a vehicle conveying the tank 210 can move past the stationary detector 312. Signals detected by the detector 312 can be used to quickly determine information about the condition of the tank 210.

Detectors 312 may also be mounted to the tank 210 and configured to continually or periodically measure the resonant frequency of sensors 218 in the conductive coating 214. The tank 210 can include multiple detectors 312 configured to detect a condition of different areas of the cured coating 214. Some detectors 312 can be positioned to measure a condition of a coating 214 on the inner surface 234 of the tank body 212. Other detectors can be positioned to detect leaks near openings or ports of the tank 210. Other detectors 312 can be positioned to monitor a condition of a coating 214 covering the outer surface 236 of the tank 210. In that case, information detected by the different detectors 312 can be processed and analyzed to determine information about an overall condition of the tank 210 and/or to draw conclusions about causes of deterioration of the cured coatings 214. Receiving signals from different areas of the tank 210 can be useful for determining whether deterioration of the coating 214 is localized or results from structural deterioration of the entire tank. In particular, signals from sensors 318 in multiple locations on the tank 210 indicating that the coating 214 is deteriorating or corroding may indicate that the tank 210 is leaking and/or has other substantial structural failures. In that case, the tank 210 may need to be replaced. If signals from only some of the sensors 218 indicate that the coating 214 is deteriorating, it may be possible to repair such portions of the tank 210 without replacing the entire tank 210.

The system 300 may also include the controller 318, which can be electrically connected to the detector 312. The controller 318 can be an integral electronic component of the radio frequency detector 312, as described previously. Alternatively, the controller 318 can be associated with another electronic device or system, such as a portable computer tablet, smart phone, or an element of a larger computer system or computer server.

The controller 318 is configured to control the signal generator 314 and antenna 316. In particular, the controller 318 can cause the signal generator 314 to emit the radio frequency signal to activate the sensors 218, and can detect and record the response signal from the sensors 218. The controller 318 can also be configured to process and analyze the received response signals by performing processing routines on recorded signals including removing signal noise, analyzing the received signal to identify changes in dielectric properties of the cured coating 214, and providing feedback to users about a condition of the cured coating 214, as in previously described systems. Feedback can be provided by a feedback device 322 or can be provided to a remote device, system, or network over the wireless interface 324.

As discussed previously, the monitoring systems 300 disclosed herein can also be adapted to monitor a condition of an insulated pipe. The pipe can be an insulated pipe comprising a tubular body formed from a metal material. The tubular body can corrode when exposed to moisture. Radio frequency sensors, such as sensors 218, 250, can be positioned on the pipe, such as between an insulation layer covering the pipe and an outer surface of the tubular body. The sensors 218, 250 can be monitored to determine a condition of the tubular body and/or a condition of a coating on the tubular body using the detector 312 and processing capabilities previously described. Information about the pipe collected by the monitoring system 300 can be used to determine whether portions of the tubular body of the pipe are corroding and/or have corroded. Information sensed by the sensors 218, 250 can also be used to determine a remaining usable life of the pipe and/or to schedule maintenance or repair for portions of the pipe.

Method of Cleaning and Preparing a Container for Re-use

As discussed previously, tanks 210, such as transport tanks, can be used to transport different types of liquid chemicals, such as hydrocarbon fluids. The tanks 210 need to be cleaned between uses, so that liquid chemicals and gasses that penetrate into and/or are absorbed by the coating 214 do not contaminate a next cargo of liquid chemicals stored in the tank 210.

More specifically, even when the coating 214 is intact, materials stored in tanks 210 can be absorbed by the tank coating 214 or lining. If the tank 210 is refilled with a different type of chemical or material, the absorbed chemicals may leach into and contaminate liquids stored in the refilled tank 210. It would be desirable to refill tanks 210 as quickly as possible after chemicals have been drained from the tank 210. However, using aggressive cleaning techniques to quickly clean and/or recondition the tanks 210 can damage the coating 214. Therefore, in many cases, cleaning guidelines for tanks 210 require that tanks 210 are left unfilled for a period of time, such as a few days or one week. This period of time is required to ventilate the empty tanks 210 and, specifically, to provide sufficient time for residual chemicals in the tank lining or coating 214 to fully vaporize so that contamination does not occur. After the predetermined time, the tank 210 can be refilled and returned to service.

The radio frequency monitoring system 300 can be used to monitor a condition of the tank 210 and coating 214 to assess the condition of coating 214. The monitoring and assessment can be performed in real time and/or can be based on real time data collected by sensors 218 in the coating 214. While not intending to be bound by theory, it is believed that the radio frequency system 300 and sensors 218 of the present disclosure can be used to provide quantitative confirmation that any materials absorbed by the coating 214 or lining have vaporized. Such quantitative information can be used to identify when the tank 210 can be refilled with a next cargo containing a different liquid chemical. The assessment may also be used to identify when a next step in a cleaning procedure for a tank 210 can be performed. Such quantitative confirmation can reduce time that the tanks 210 must remain empty before refilling. Specifically, the quantitative feedback provided by the radio frequency system 300 can show that the coating 214 is in suitable condition for the tank 210 to be refilled, which may occur after only a few days and far sooner than the conventional week-long empty period required by current guidelines. Accordingly, the quantitative feedback about the condition of the coating 214 can allow for tanks 210 to be returned to service more quickly than presently accomplished. The quantitative feedback can also reduce a number of washing cycles performed on the tank 210 before it is returned to service. Currently, a tank 210 may be scheduled to undergo multiple washing cycles before being refilled. The quantitative feedback provided by the system 300 may show that fewer than the scheduled number of washing cycles need to be performed. Since the washing cycles can be aggressive to the coating 214, reducing a number of cycles performed on the tank 210 and coating 214 can extend the usable life of the coating 214. Also, analysis and review of the quantitative feedback about the coating 214 can identify tanks 210 having a compromised coating 214, which does not return to the baseline or reusable condition even after a long period of time. Such tanks 210 can be scheduled to be repaired or replaced.

Figure 9:
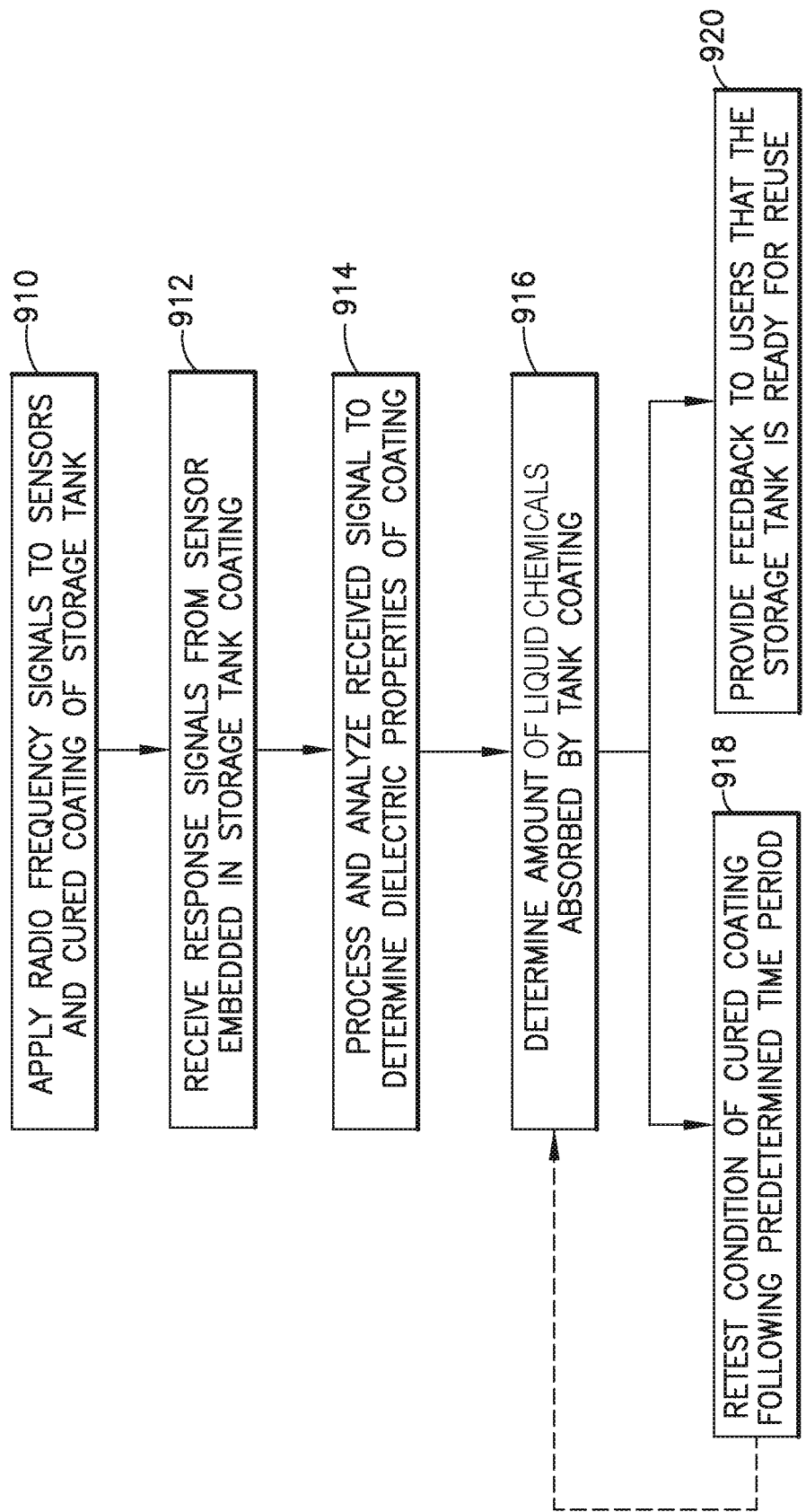
FIG. 9 is a flow chart showing a method for monitoring a tank.

A method performed by the controller 318 of the system 300 for monitoring a condition of the tank 210 to confirm that the tank 210 is ready for reuse is shown by the flow chart in FIG. 9. The method can include, at step 910, applying the radio frequency signals to sensors 218 positioned in a cured coating 214 covering at least a portion of an inner surface 234 of the tank 210. Such radio frequency signals are provided by a radio frequency generator 314 of the radio frequency detector 312 or scanner, as described previously. At step 912, the method further includes receiving response signals from sensors 218. The response signals can be electromagnetic and radio frequency signals emitted by the sensors 218 in response to the applied radio frequency signals. The response signals can represent a resonant frequency of the sensors 218 and dielectric properties of the coating 214.

At step 914, the method further includes processing and analyzing the received response signals to determine one or more electrical and/or dielectric properties of the cured coating 214. Processing and analyzing the received response signals can include determining dielectric properties, such as the permittivity or dielectric constant of the coating 214, based on the received response signals.

At step 916, the method further includes determining an amount of the liquid chemical or gasses that has penetrated into and/or been absorbed by the cured coating 214. The determination can be based on a comparison between the determined dielectric properties of the cured coating 214 and baseline values for the cured coating 214 measured prior to initial use of the tank 210. The determination can include comparing a measured resonant frequency for the sensors 218 to a resonant frequency of the sensors 218 prior to initial use, often referred to as the baseline value for the sensors 218. Differences between the initial or baseline resonant frequency and the measured resonant frequency are believed to be representative of an amount of the liquid chemical and/or gasses absorbed by the coating 214. The analysis may also include comparing the measured resonant frequency with values from an experimentally derived or estimated calibration curve showing an amount of the liquid chemicals and/or gasses absorbed by the coating at different resonant frequency values. When the comparison with the baseline values and/or calibration curve indicates that the threshold maximum amount of the absorbed liquid chemicals or gasses is exceeded, at step 918, the method can further include providing a notification to a user instructing the user to begin or continue ventilating the tank. As discussed previously, ventilation allows any remaining liquid chemicals or gasses absorbed by the cured coating 214 to vaporize or evaporate.

At step 918, the method can further include, following a predetermined time period of several hours or days, retesting a condition of the cured coating 214 of the tank 210 by receiving new resonant frequency measurements from the sensors 218. The newly received resonant frequency measurements are processed and analyzed as described above. In particular, the new measurements are compared to the baseline values and/or calibration curve to determine whether the amount of absorbed liquid chemicals and gasses has dropped below an acceptable level. If the measured resonant frequency is still above the acceptable level, the system 300 can provide a notification to the user to continue ventilating the tank 210 until the resonant frequency decreases below an acceptable level.

At step 920, once the measured resonant frequency values sensed by the sensors 218 show that the amount of liquid chemicals and gasses absorbed by the coating 214 has reduced below an acceptable level, a notification can be provided to the user informing the user that the storage tank 210 is fully cleaned and ventilated, and can be refilled with the liquid chemicals.

The present disclosure also includes the following aspects.

A first aspect is directed to a radio frequency signaling system, comprising: a curable coating composition configured to be cured to form a cured coating; and a sensor received in the curable coating composition, the sensor comprising circuitry forming an inductor-capacitor circuit, the circuitry having a maximum outer diameter of 10 µm-2.0 mm, wherein the circuitry is configured to generate an electromagnetic field in response to an external radio frequency signal.

A second aspect is directed to the signaling system of the first aspect, wherein the sensor is configured to measure a dielectric property of the cured coating based on measurements of the generated electromagnetic field that penetrates into the cured coating.

A third aspect is directed to the signaling system of the first aspect or the second aspect, wherein the sensor further comprises a sensor body comprising a surface, wherein the circuitry is mounted to the surface of the sensor body, and wherein a major dimension of the surface is 10 µm-2.0 mm.

A fourth aspect is directed to the signaling system of the third aspect, wherein the sensor further comprises a protective layer covering the surface of the sensor body and the circuitry, and wherein the electromagnetic field comprises a fringing component generated by the circuitry extending above the protective layer and the fringing component of the electromagnetic field penetrates into the cured coating.

A fifth aspect is directed to the signaling system of the fourth aspect, wherein at least a portion of the circuitry is not covered by the protective layer and is in direct contact with the cured coating.

A sixth aspect is directed to the signaling system of the third aspect or the fourth aspect, wherein the circuitry comprises a plurality of conductive loops extending around the surface of the sensor body.

A seventh aspect is directed to the signaling system of any of the third through sixth aspects, wherein the circuitry comprises a plurality of interdigitating capacitors extending across the surface of the sensor body.

An eighth aspect is directed to the signaling system of any of the first through seventh aspects, wherein the curable coating composition comprises a paint, a primer, a sealant, and/or an adhesive.

A ninth aspect is directed to the signaling system of any of the first through eighth aspects, wherein the circuitry comprises a conductor having a width of 0.01 µm-1.0 µm.

A tenth aspect is directed to the signaling system of any of the first through ninth aspects, wherein the curable coating composition comprises a reaction mixture comprising monomers that polymerize to form a dielectric polymer.

An eleventh aspect is directed to a radio frequency system for monitoring a condition of a cured coating, the system comprising: a cured coating formed from a curable coating composition; a sensor positioned in the cured coating, the sensor comprising circuitry forming an inductor-capacitor circuit, the circuitry having a maximum outer diameter of 10 µm-2.0 mm; and a radio frequency device configured to: generate and provide a radio frequency signal to the cured coating sufficient to power the circuitry of the sensor, wherein the radio frequency signal causes the circuitry to generate the electromagnetic field, such that the electromagnetic field extends from the circuitry into the cured coating; and measure a frequency response of the circuitry.

A twelfth aspect is directed to the system of the eleventh aspect, further comprising a controller in electrical communication with the radio frequency device configured to monitor the condition of the cured coating based on the measured frequency response of the circuitry of the sensor.

A thirteenth aspect is directed to the system of the eleventh aspect or the twelfth aspect, wherein the controller monitors the condition of the cured coating by continually or periodically receiving information from the sensor and comparing the received information to a predetermined frequency response value.

A fourteenth aspect is directed to the system of the twelfth aspect or the thirteenth aspect, wherein the controller is configured to identify a change in a dielectric property of the cured coating based on the information received from the sensor and provide feedback to a user about the condition of the cured coating based on the identified change in the dielectric property of the cured coating.

A fifteenth aspect is directed to the system of any of the twelfth through fourteenth aspects, wherein the controller is further configured to: determine a baseline state for the sensor, the baseline state comprising a resonance frequency for the sensor; monitor a frequency response of the sensor when the radio frequency signal is applied to the sensor; identify a resonance frequency shift for the sensor; and continue to monitor the resonance frequency of the sensor to determine when the resonance frequency of the sensor returns to the baseline state.

A sixteenth aspect is directed to a container configured to be monitored by a radio frequency signaling system, the container comprising: a container body comprising an outer surface and an inner surface; a cured coating on the inner surface and/or the outer surface of the container body; and a sensor positioned in the cured coating configured to detect absorption of a fluid contained in the container body by the cured coating.

A seventeenth aspect is directed to the container of the sixteenth aspect, wherein the sensor comprises circuitry forming an inductor-capacitor circuit, the circuitry having a maximum outer diameter of 10 µm-2.0 mm.

An eighteenth aspect is directed to the container of the sixteenth aspect or the seventeenth aspect, wherein the circuitry is configured to generate an electromagnetic field in response to an external radio frequency signal.

A nineteenth aspect is directed to the container of any of the sixteenth through eighteen aspects, wherein the container body comprises a metal substrate, and wherein the cured coating comprises a dielectric polymer.

A twentieth aspect is directed to the container of any of the sixteenth through nineteenth aspects, further comprising a coil antenna mounted to the container, the coil antenna being configured to generate a radio frequency signal sufficient to induce the sensor to generate an electromagnetic field extending from the circuitry into the cured coating.

A twenty-first aspect is directed to a method of monitoring a condition of a container containing a fluid, the method comprising: receiving, with a processor, a radio frequency signal from a sensor positioned within a cured coating covering a surface of the container; processing, with a processor, the received radio frequency signal to determine an electrical property of the cured coating; and determining, with a processor, an amount of the fluid that has been absorbed by the cured coating based on a comparison between the determined electrical property of the cured coating and a baseline for the electrical property of the cured coating.

A twenty-second aspect is directed to the method of the twenty-first aspect, wherein the determined electrical property comprises a dielectric property of the cured coating, and wherein the baseline comprises a dielectric property of the cured coating determined prior to an initial use of the container.

A twenty-third aspect is directed to the method of the twenty-first or twenty-second aspects, wherein the fluid contained in the container comprises a liquid chemical, the method further comprising comparing a determined amount of the liquid chemical absorbed by the cured coating to a threshold maximum amount of the absorbed liquid chemical.

A twenty-fourth aspect is directed to the method of the twenty-third aspect, further comprising ventilating the container until the determined amount of the liquid chemical absorbed by the cured coating is less than or equal to the threshold maximum amount of the absorbed liquid chemical.

A twenty-fifth aspect is directed to an article comprising: a body comprising a dielectric material; and a sensor embedded in the dielectric material of the body, the sensor comprising circuitry forming an inductor-capacitor circuit, the circuitry having a maximum outer diameter of 10 µm-2.0 mm, wherein the circuitry is configured to generate an electromagnetic field in response to an external radio frequency signal.

A twenty-sixth aspect is directed to the article of the twenty-fifth aspect, wherein the article comprises an article manufactured by additive manufacturing, molding, or a combination thereof.

A twenty-seventh aspect is directed to the article of the twenty-fifth aspect or the twenty-sixth aspect, wherein the article is a molded article manufactured by rotational molding, injection molding, compression molding, extrusion molding, or by a hand lay-up process.

A twenty-eighth aspect is directed to the article of any of the twenty-fifth through the twenty-seventh aspects, wherein the sensor is configured to measure a dielectric property of the cured material based on measurements of the generated electromagnetic field.

A twenty-ninth aspect is directed to the article of any of the twenty-fifth through twenty-eighth aspects, wherein the electromagnetic field generated by the circuitry penetrates into the cured material.

A thirtieth aspect is directed to the article of any of the twenty-fifth through twenty-ninth aspects, wherein the cured material comprises a reaction mixture comprising monomers that polymerize to form a dielectric polymer.

A thirty-first aspect is directed to an insulated pipe configured to be monitored by a radio frequency signaling system, the insulated pipe comprising: an elongated tube comprising an inner surface and an outer surface; a cured coating on the inner surface or the outer surface of the elongated tube; a sensor partially or fully encapsulated by the cured coating configured to sense a dielectric property of the cured coating; and insulation covering the cured coating and/or outer surface of the elongated tube.

A thirty-second aspect is directed to the insulated pipe of the thirty-first aspect, wherein the sensor comprises a sensor body comprising a surface and circuitry mounted to the surface of the sensor body forming an inductor-capacitor circuit, and wherein the circuitry is configured to generate an electromagnetic field that penetrates into the cured coating in response to an external radio frequency signal.

A thirty-third aspect is directed to the insulated pipe of the thirty-second aspect, wherein the circuitry has a maximum outer diameter of 10 µm-2.0 mm.

A thirty-fourth aspect is directed to the insulated pipe of the thirty-second or the thirty-third aspect, wherein the circuitry comprises a plurality of conductive loops extending around the surface of the sensor body.

A thirty-fifth aspect is directed to the insulated pipe of any of the thirty-second through thirty-fourth aspects, wherein the circuitry comprises a plurality of interdigitating capacitors extending across the surface of the sensor body.

A thirty-sixth aspect is directed to the insulated pipe of the thirty-first aspect, wherein the elongated tube comprises a metal substrate and the cured coating comprises a dielectric polymer.

A thirty-seventh aspect is directed to the insulated pipe of any of the thirty-first through thirty-sixth aspects, further comprising a coil antenna mounted to the elongated tube, the coil antenna being configured to generate a radio frequency signal sufficient to induce the sensor to generate an electromagnetic field extending from the sensor into the cured coating.

A thirty-eighth aspect is directed to the insulated pipe of any of the thirty-first through thirty-seventh aspects, wherein the insulation comprises open cell foam insulation, closed cell foam insulation, fiber glass insulation, cellulose insulation, cotton batts, or wool batts.

EXAMPLES

Sensor Fabrication and Characterization

RF sensors were fabricated using standard semiconductor processing techniques to create a metal pancake coil that, by design, resonates at a particular, preselected RF frequency. The RF sensors were manufactured as follows. The fabrication method started with blank quartz wafer substrates. A seed metal layer of Ti/Cu was deposited on one side of the quartz substrates. A photoresist layer was then coated on the seed metal. Using a lithographic process, the metal coil pattern was opened in the photoresist layer exposing the seed metal. The overall size of the coil pattern was within a range of 1 mm to 5 mm. The width of the conductors in the coil ranged from 5 µm to 40 µm. Spacing between the conductors ranged from 5 µm to 100 µm. Copper was then electrolytically plated in the exposed seed metal areas to a thickness ranging from 5 µm to 40 µm. The patterned photoresist layer was then removed and the exposed seed metal was etched away using plated metal as an etch mask. A protective dielectric film was then deposited over the metal coil, such as a layer of BCB (benzocyclobutene). The substrate, including the fabricated circuitry, was then diced into individual sensors.

During the sensor fabrication process, the individual sensors were characterized using test structures configured to show proper formation of the circuitry. Using the test structures, the sensors were optically or electrically probed to verify that the gaps and metal lines between portions of the sensor circuitry were correct. Specifically, in order to test gap distance of the sensors, the sensors were probed with an interpenetrating comb structure. The interpenetrating comb structure included a plurality of spaced apart combs. A gap distance between adjacent combs was intended to be the same or smaller than a gap distance for sensors of the circuitry. Using the comb structure, the sensors were probed to confirm that the sensor had a high resistance value corresponding to a well formed gap. Conversely, a measured low resistance value would indicate that there was a fault in the gap leading to an electrical short between combs.

Also, a long serpentine line was used to electrically verify that the fabricated sensors performed correctly. A resistance of the metal line was measured and compared to a value of resistance calculated based on resistivity of a metal and cross-sectional area and length of the line. Too high of a value of resistance would indicate a narrowing or break in the metal line. Conversely, too low a value of resistance indicates too wide of line or shorting between the turns of the serpentine line.

Once the substrate was diced into the individual sensors and the sensor circuitry was characterized as described herein, the sensors were tested using an RF analyzer connected to an RF antenna. Testing the sensors included performing a frequency sweep by the RF network analyzer that included the resonant frequency of the sensor. The responsive resonant signal output by the sensor was then monitored. It was determined that the sensor absorbed some energy from the supplied RF signal near the sensor resonant frequency and a corresponding dip was observed in the reference signal. The frequency at the lowest value of the measured reference signal corresponded to the resonant frequency. From the half power bandwidth points of the sweep, the Q for the sensor was calculated.

The fabricated sensors were tested in air prior to embedding in a cured coating to characterize the sensor performance and to remove any defective sensors. This testing may also be done prior to the dicing of the substrate with an appropriately sized antenna that only energizes one sensor at a time. Bad sensors were marked with an ink drop and were removed from the supply of sensors after dicing. After the initial testing, the sensors were embedded in the coating, as described below, and re-measured. It was necessary to re-measure the sensors after embedding in the coating to provide the baseline values of the sensor performance including the effects of the coating on the resonance of the sensors.

Embedded Sensors as Detectors for Absorbed Methanol

Following formation and initial testing of the sensors, a substrate was prepared as follows. Initially, a substrate of cold rolled steel was sand blasted to a surface roughness of SA 2 ½. Test panels were identified or coded (e.g., engraved with an identification number using a Dremel rotary tool). The panels were accurately weighed to a significance of 4 digits. PhenGuard™ 930 epoxy primer, commercially available from PPG Protective and Marine Coatings, was applied to the panels by air spraying forming a primer coating at 150 µm dry film thickness. Two RF sensors, fabricated in the manner previously described, were positioned in the wet coating with circuitry (e.g., coils) of the sensors facing in an upward direction. The sensors were gently pressed into the wet coating. The coating was then cured to embed the sensors within the coating. After curing for 2 days at ambient temperature, a finish coat of PhenGuard™ 940 was applied at 150 µm dry film thickness. Application of the finish coat effectively encapsulated the two sensors between the two layers of coating. Backsides of the panels and the edges were coated with the same coating to prevent corrosion in the immersion testing.

After 3 weeks curing, a subset of the panels were hot cured in tap water at 60° C. for 24 hours while the remaining samples were kept at ambient temperature. Following the ambient and/or hot curing, the panels were weighed again. After correction for the mass of the sensors (based on the average weight of 4 sensors), a mass of the coating was calculated. The coating mass was needed to calculate a relative mass change during the immersion experiments.

The panels were then immersed in methanol at ambient temperature for 2 weeks followed by drying at ambient temperature for a period of 1 week. During the immersion process, some methanol was absorbed by the coating, while some low molecular weight components of the coating leached out of the film. The net change in mass was about a 4% increase in the coating mass. During the drying stage adsorbed methanol was released from the film ultimately leading to a net decrease of about 2% from the original mass of the coating. The absorption of methanol by the coating resulted in a resonant frequency shift of about −9%. As the film dried, it was determined that the resonant frequency increased in a linear fashion until it returned to the original resonant frequency of the sensors.

Based on the determination that the resonant frequency returned to a previous value, it is believed that the shift in resonant frequency can serve as an indicator that methanol has penetrated into, been absorbed by, and/or has become retained within a coating or film. Further, since the resonant frequency appears to return to a prior value as the film dries, it is believed that the resonant frequency can serve as an indicator that the coating has returned to the baseline state without measurable quantities of absorbed methanol.

Alternative Test Cycles for Absorbed Methanol

Six grit blasted steel panels (numbered 1 to 6) of known weight (prepared as described previously) were coated with a two coat system providing a coating having a total thickness of approximately 300 µm dry film thickness. The coating comprised a solvent borne phenolic epoxy lining. Twelve RF sensors, similar or the same as sensors fabricated for the previously described examples and having a known initial resonant frequency, were embedded in the coating on the panels (e.g., 2 sensors per panel). Specifically, two of the sensors (e.g., a top sensor and a bottom sensor) on each panel were positioned in the wet first coat on one side of the panel with the coil facing up by gently pressing the sensors into the soft coating. After curing at ambient temperature, the finish coat was applied at 150 µm dry film thickness. The backsides of the panels and the edges were also coated with the same coating to prevent corrosion.

After full cure, the even numbered panels received a heated cure in tap water of 60° C. for 24 hrs. The panels were then left to dry for 4 days at ambient conditions. All of the panels were weighed again. Mass changes presented herein are relative to total weight. The coated panels were then exposed to three cyclic tests, modelling for operational cycles in chemicals transport and cleaning. For each of the three testing cycles, the panels were fully immersed. A mass change for the panels and sensor signals emitted by the sensors were monitored to assess effects of the three cyclical exposures on the panels, coatings, and sensors. Graphs showing the mass change versus sensor signal change are shown in FIGS. 10A-10F. Specifically, the following test cycles were provided to the panels.

Cycle 1: Methanol-methanol. For this cycle, the panels were immersed in methanol at ambient temperature for 2 weeks, followed by 1 week ventilation, and then re-immersed in methanol (Panels 1 and 2).

Cycle 2: Water-water. For this cycle, the panels were immersed in tap water at ambient temperature for 2 weeks, followed by 1 week ventilation, and then re-immersed in tap water. (Panels 3 and 4).

Cycle 3: Methanol-water. For this cycle, the panels were immersed in methanol at ambient temperature for 2 weeks, followed by 1 week ventilation. Following ventilation, the panels were immersed in tap water at ambient temperature for 2 weeks, followed by 1 week ventilation. The panel was then re-immersed in the methanol (Panels 5 and 6).

Figure 10A:
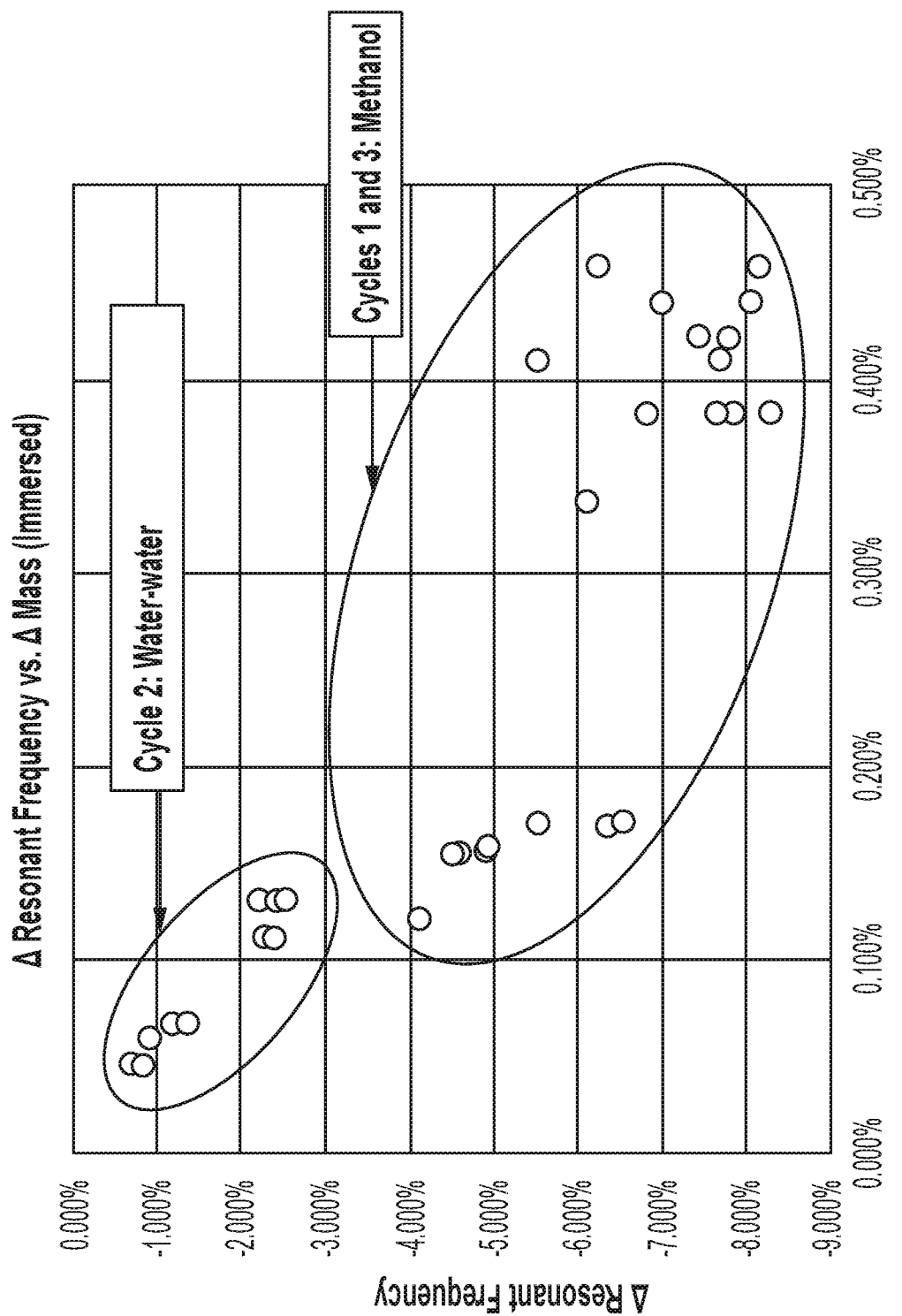
Figure 10C:
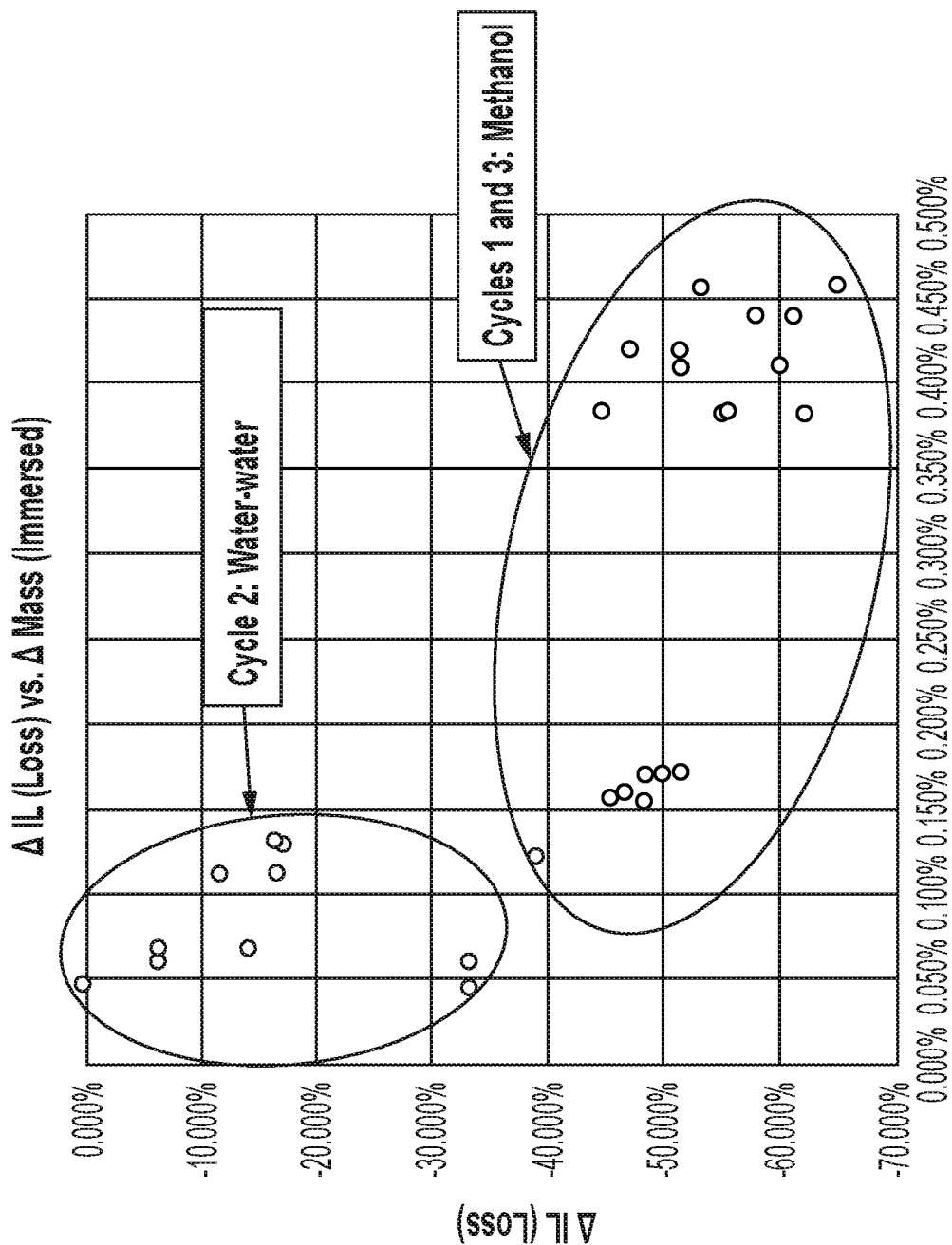

The graphs in FIGS. 10A-10C show sensor measurements immediately following the immersion phase. Graphs in FIGS. 10D-10F show sensor measurements following the ventilation or drying phase.

As shown in FIGS. 10A-10C, the change in sensor characteristics is more pronounced for the panels immersed in methanol than for sensors immersed in tap water. As shown in FIG. 10A, resonant frequency for the panels immersed in tap water changed by less than 3.00%. Resonant frequency for panels immersed in methanol changed by as much as 9.0%.

Figure 10D:
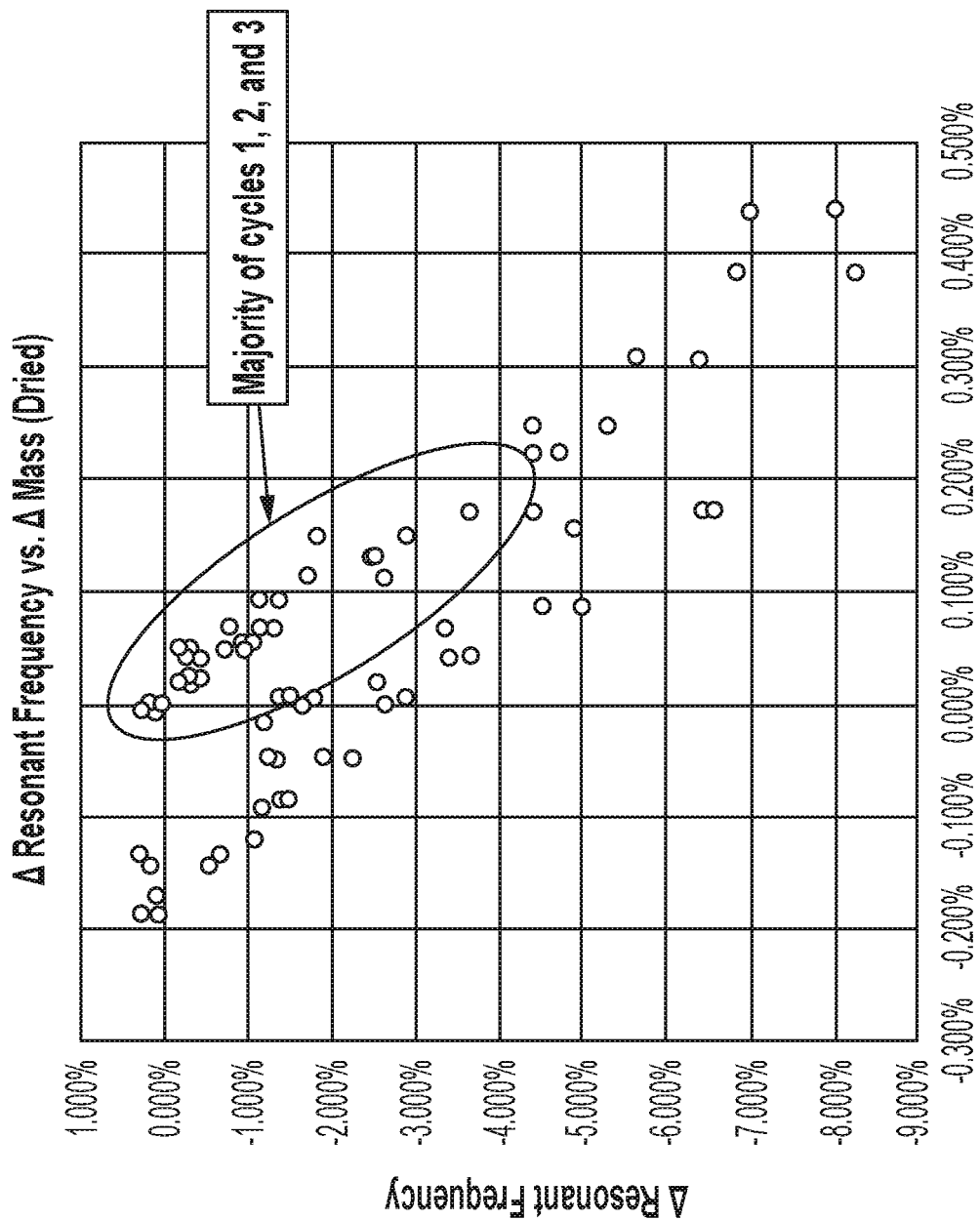
FIGS. 10D-10F are graphs showing changes in sensor signals versus change in mass for panels that have been ventilated and dried for a period of time.
Figure 10E:
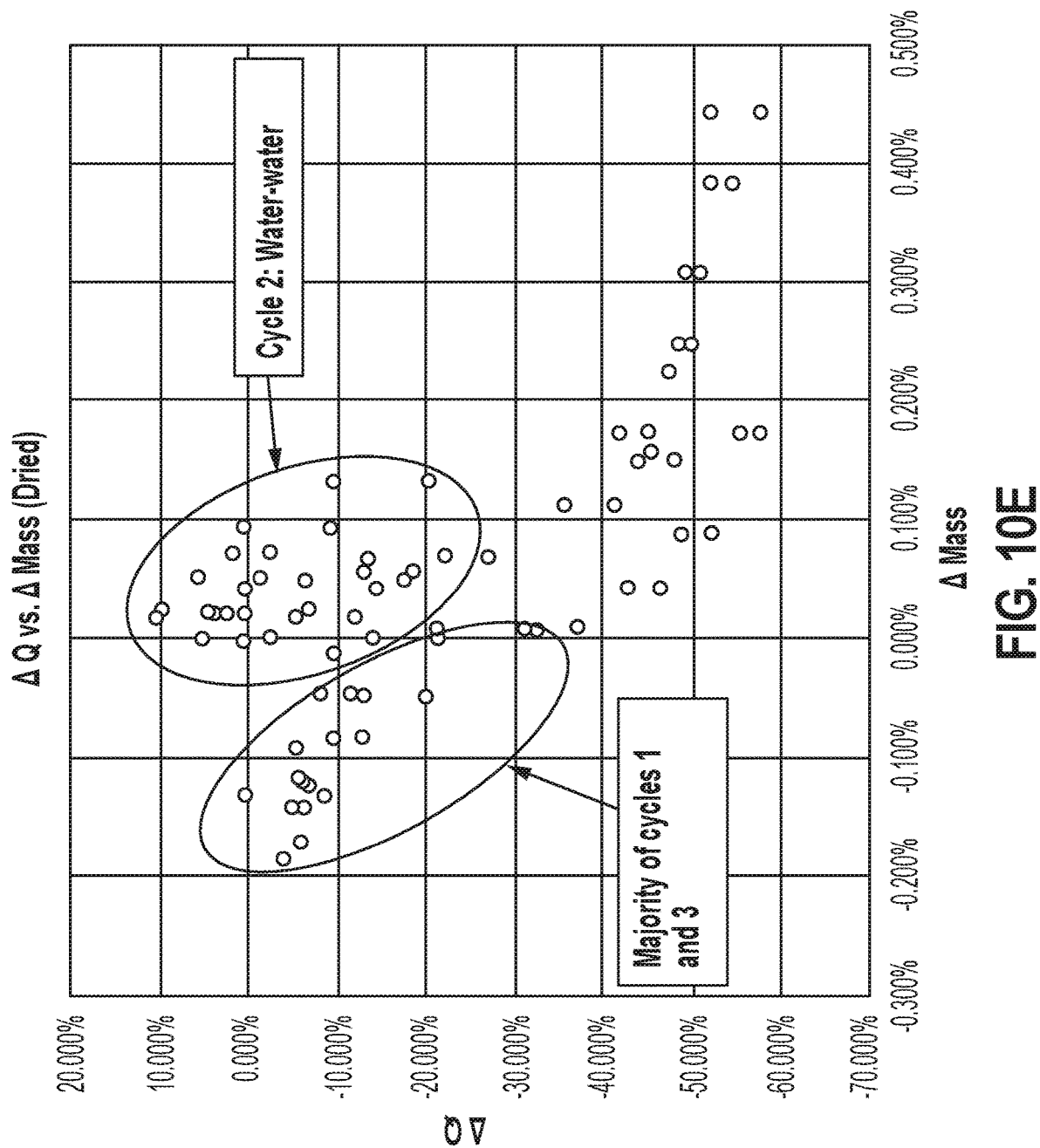
Figure 10F:
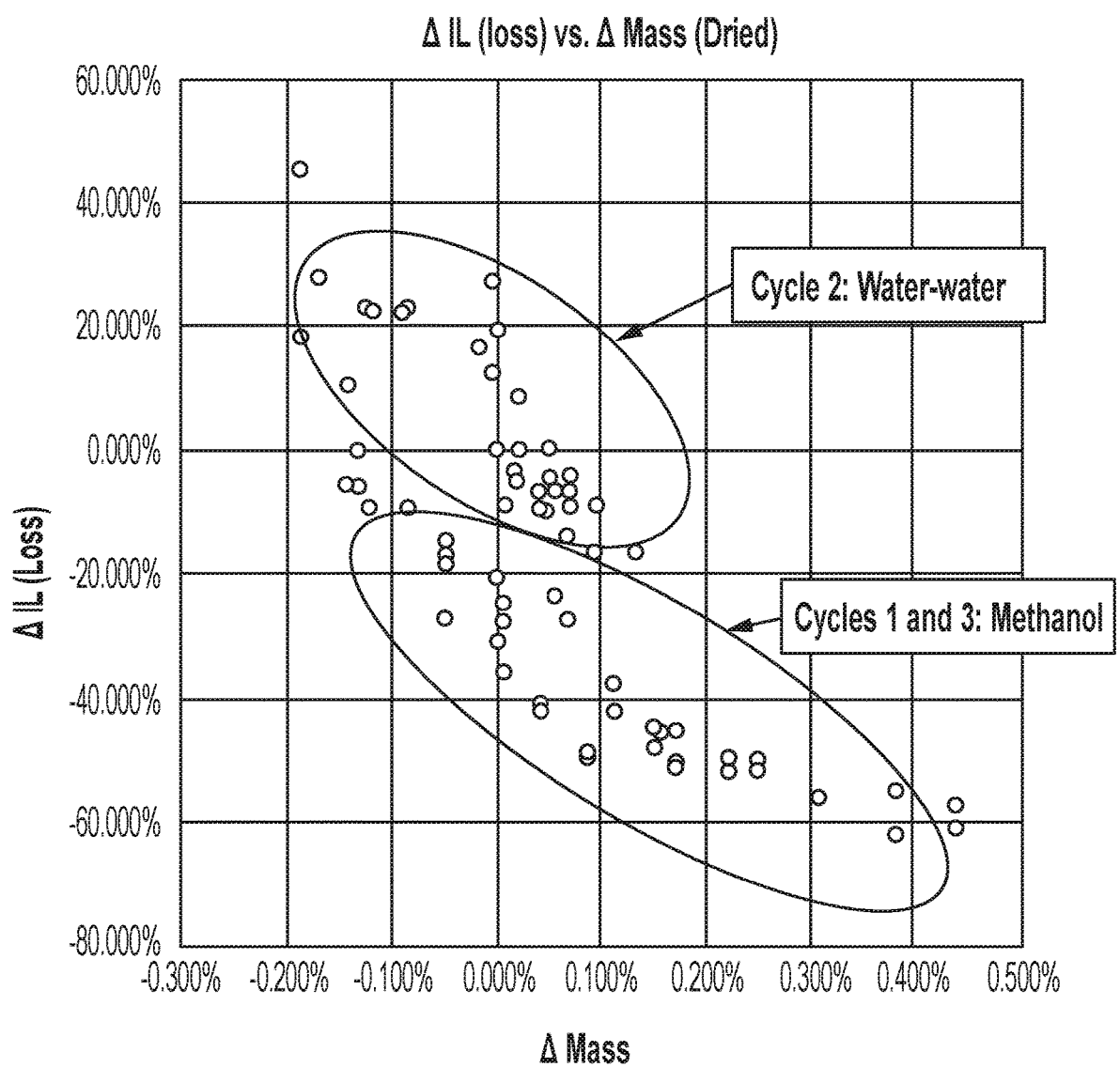

FIGS. 10D-10F show that sensor characteristics for the different sensors are far closer following a week long ventilation. As shown in FIG. 10D, most of the collected resonant frequency measurements varied by less than 3.0%. Further, only two data points showed a change in resonant frequency of more than 7.0%. Sensor measurements for Q and energy loss show similar results.

In summary, the results shown in FIGS. 10A-10C indicate that sensor characteristics changed more when the coating was immersed in methanol than in tap water. These results demonstrate that the sensors are sensitive enough to identify and distinguish between different liquids and/or chemicals absorbed by the coatings. Also, there was a shift in the resonant frequency Q and insertion loss IL relative to mass change for some of the immersed panels compared to corresponding dried panels. However, the changes in sensor characteristics was demonstrated to be largely reversible, as shown in FIGS. 10D-10F. In particular, FIGS. 10D-10F show that percent change for sensor characteristics decreases following ventilation.

Whereas particular embodiments of this invention have been described above for purposes of illustration, it will be evident to those skilled in the art that numerous variations of the details of the present invention may be made without departing from the invention as defined in the appended claims.

The invention claimed is:

1. A radio frequency signaling system, comprising:
a curable coating composition configured to be cured to form a cured coating on a substrate body, wherein the curable coating composition comprises a non-conductive primer layer applied to at least a portion of the substrate body; and
a sensor received in the curable coating composition, wherein:
the sensor comprises circuitry forming an inductor-capacitor circuit, the circuitry having a maximum outer diameter of 10 µm-2.0 mm, and
the sensor is positioned in a layer of the curable coating composition that is above the non-conductive primer layer;
wherein the circuitry is configured to generate an electromagnetic field in response to an external radio frequency signal.

2. The signaling system of claim 1, wherein the sensor is configured to measure a dielectric property of the cured coating based on measurements of the generated electromagnetic field that penetrates into the cured coating.

3. The signaling system of claim 1, wherein the sensor further comprises a sensor body comprising a surface, wherein the circuitry is mounted to the surface of the sensor body, and wherein a major dimension of the surface is 10 µm-2.0 mm.

4. The signaling system of claim 3, wherein the sensor further comprises a protective layer covering the surface of the sensor body and the circuitry, and wherein the electromagnetic field comprises a fringing component generated by the circuitry extending above the protective layer and the fringing component of the electromagnetic field penetrates into the cured coating.

5. The signaling system of claim 4, wherein at least a portion of the circuitry is not covered by the protective layer and is in direct contact with the cured coating.

6. The signaling system of claim 3, wherein the circuitry comprises a plurality of conductive loops extending around the surface of the sensor body.

7. The signaling system of claim 3, wherein the circuitry comprises a plurality of interdigitating capacitors extending across the surface of the sensor body.

8. The signaling system of claim 1, wherein the curable coating composition comprises a paint, a primer, a sealant, and/or an adhesive.

9. The signaling system of claim 1, wherein the circuitry comprises a conductor having a width of 0.01 µm-1.0 µm.

10. The signaling system of claim 1, wherein the curable coating composition comprises a reaction mixture comprising monomers that polymerize to form a dielectric polymer.

11. A radio frequency system for monitoring a condition of a cured coating, the system comprising:
a cured coating on a substrate body, the cured coating formed from a curable coating composition, wherein the curable coating composition comprises a non-conductive primer layer applied to at least a portion of the substrate body;
a sensor positioned in a layer of the curable coating composition that is above the non-conductive primer layer, the sensor comprising circuitry forming an inductor-capacitor circuit, the circuitry having a maximum outer diameter of 10 µm-2.0 mm; and
a radio frequency device configured to:
generate and provide a radio frequency signal to the cured coating sufficient to power the circuitry of the sensor, wherein the radio frequency signal causes the circuitry to generate an electromagnetic field, such that the electromagnetic field extends from the circuitry into the cured coating; and
measure a frequency response of the circuitry.

12. The system of claim 11, further comprising a controller in electrical communication with the radio frequency device configured to monitor the condition of the cured coating based on the measured frequency response of the circuitry of the sensor.

13. The system of claim 12, wherein the controller monitors the condition of the cured coating by continually or periodically receiving information from the sensor and comparing the received information to a predetermined frequency response value.

14. The system of claim 12, wherein the controller is configured to identify a change in a dielectric property of the cured coating based on information received from the sensor and provide feedback to a user about the condition of the cured coating based on the identified change in the dielectric property of the cured coating.

15. The system of claim 12, wherein the controller is further configured to:
determine a baseline state for the sensor, the baseline state comprising a resonance frequency for the sensor;
monitor a frequency response of the sensor when the radio frequency signal is applied to the sensor;
identify a resonance frequency shift for the sensor; and
continue to monitor the resonance frequency of the sensor to determine when the resonance frequency of the sensor returns to the baseline state.

16. A container configured to be monitored by a radio frequency signaling system, the container comprising:
a container body comprising an outer surface and an inner surface;
a cured coating on the inner surface and/or the outer surface of the container body, wherein the cured coating comprises a non-conductive primer layer applied to at least a portion of the container body; and
a sensor positioned in a layer of the cured coating that is above the non-conductive primer layer, the sensor configured to detect absorption of a fluid contained in the container body by the cured coating.

17. The container of claim 16, wherein the sensor comprises circuitry forming an inductor-capacitor circuit, the circuitry having a maximum outer diameter of 10 µm-2.0 mm.

18. The container of claim 17, wherein the circuitry is configured to generate an electromagnetic field in response to an external radio frequency signal.

19. The container of claim 16, wherein the container body comprises a metal substrate, and wherein the cured coating comprises a dielectric polymer.

20. The container of claim 17, further comprising a coil antenna mounted to the container, the coil antenna being configured to generate a radio frequency signal sufficient to induce the sensor to generate an electromagnetic field extending from the circuitry into the cured coating.

* * * * *